United States Patent
Roth et al.

(10) Patent No.: US 8,011,534 B2
(45) Date of Patent: *Sep. 6, 2011

(54) FLAVORING COMPONENT HOLDING DISPENSER FOR USE WITH CONSUMABLE BEVERAGES

(75) Inventors: Donna Roth, Plymouth, MA (US); Henry Roth, Plymouth, MA (US); Marco Wo, Providence, RI (US)

(73) Assignee: Cool Gear International, LLC, Jenkintown, PA (US)

( * ) Notice: Subject to any disclaimer, the term of this patent is extended or adjusted under 35 U.S.C. 154(b) by 781 days.

This patent is subject to a terminal disclaimer.

(21) Appl. No.: 11/931,229

(22) Filed: Oct. 31, 2007

(65) Prior Publication Data

US 2008/0116221 A1    May 22, 2008

Related U.S. Application Data

(63) Continuation-in-part of application No. 11/019,488, filed on Dec. 22, 2004, now Pat. No. 7,306,117, which is a continuation of application No. 10/361,269, filed on Feb. 10, 2003, now Pat. No. 6,959,839.

(51) Int. Cl.
*B67D 1/00* (2006.01)
*B67D 7/78* (2010.01)

(52) U.S. Cl. ...... 222/83; 222/145.5; 222/525; 222/83.5; 215/228

(58) Field of Classification Search ........... 222/80–83.5, 222/145.1, 145.5, 129, 522–525; 206/219, 206/222; 215/227, 228; 220/521
See application file for complete search history.

(56) References Cited

U.S. PATENT DOCUMENTS

| | | | |
|---|---|---|---|
| D100,412 S | 7/1936 | Carp | |
| 3,156,369 A | 11/1964 | Bowes et al. | |
| D219,642 S | 1/1971 | Prahs et al. | |
| 3,651,990 A * | 3/1972 | Cernei | 222/94 |
| 3,655,096 A | 4/1972 | Easter | |
| 3,966,089 A | 6/1976 | Klingaman | |
| 4,757,916 A | 7/1988 | Goncalves | |
| 4,785,974 A | 11/1988 | Rudick et al. | |
| 4,950,083 A | 8/1990 | Bavaveas | |
| 5,000,314 A | 3/1991 | Fuller et al. | |
| 5,071,034 A | 12/1991 | Corbiere | |
| 5,125,534 A | 6/1992 | Rose et al. | |
| 5,246,142 A | 9/1993 | Di Palma | |
| 5,325,996 A | 7/1994 | Bannigan | |
| 5,328,063 A | 7/1994 | Beck et al. | |
| 5,373,937 A | 12/1994 | Lamboy | |
| 5,419,445 A | 5/1995 | Kaesemeyer | |
| 5,421,483 A | 6/1995 | Parise | |
| 5,474,209 A | 12/1995 | Vallet Mas et al. | |
| 5,543,528 A | 8/1996 | Lanfranconi et al. | |
| 5,669,533 A | 9/1997 | Kelley et al. | |
| 5,772,017 A | 6/1998 | Kang | |
| 5,836,479 A | 11/1998 | Klima et al. | |
| 5,860,569 A | 1/1999 | Gregoire | |
| 5,871,122 A | 2/1999 | Klima et al. | |

(Continued)

*Primary Examiner* — Kevin P Shaver
*Assistant Examiner* — Melvin A Cartagena
(74) *Attorney, Agent, or Firm* — Steven M. Jensen; Brian R. Landry; Edwards Angell Palmer & Dodge LLP

(57) ABSTRACT

A dispenser for a bottle that is adapted to contain a consumable beverage. The dispenser may be reusable to facilitate easy use and last minute selection of flavoring component for a consumable beverage.

15 Claims, 18 Drawing Sheets

U.S. PATENT DOCUMENTS

| | | |
|---|---|---|
| 5,875,888 A | 3/1999 | Albisetti |
| 5,875,889 A | 3/1999 | Albisetti |
| 5,890,624 A | 4/1999 | Kima et al. |
| 5,927,549 A | 7/1999 | Wood |
| 5,947,332 A | 9/1999 | Klima, Jr. et al. |
| 5,950,819 A | 9/1999 | Sellers |
| 5,984,141 A | 11/1999 | Gibler |
| 6,041,969 A | 3/2000 | Parise |
| 6,050,452 A | 4/2000 | Pradinas |
| 6,092,649 A | 7/2000 | Sergio et al. |
| 6,116,445 A | 9/2000 | Ikemori et al. |
| 6,123,230 A | 9/2000 | Kilma |
| 6,152,326 A | 11/2000 | Kilma |
| 6,155,459 A | 12/2000 | Bunschoten |
| 6,165,523 A | 12/2000 | Story |
| 6,182,865 B1 | 2/2001 | Bunschoten et al. |
| 6,224,922 B1 | 5/2001 | Fonte |
| 6,250,511 B1 | 6/2001 | Kelly |
| 6,269,979 B1 | 8/2001 | Dumont |
| 6,290,100 B1 | 9/2001 | Yacko |
| 6,305,576 B1 | 10/2001 | Leoncavallo |
| 6,367,622 B1 * | 4/2002 | Hsu ............................ 206/222 |
| 6,372,270 B1 | 4/2002 | Denny |
| 6,412,526 B2 | 7/2002 | Castillo |
| 6,672,817 B2 | 1/2004 | Denny |
| 6,772,910 B1 | 8/2004 | Coory |
| 6,959,839 B2 | 11/2005 | Roth et al. |
| 7,306,117 B2 | 12/2007 | Roth et al. |
| 7,562,782 B2 * | 7/2009 | Yorita ......................... 215/228 |
| 7,909,210 B2 | 3/2011 | Roth et al. |
| 2004/0155061 A1 | 8/2004 | Roth et al. |
| 2005/0127101 A1 | 6/2005 | Roth et al. |

\* cited by examiner

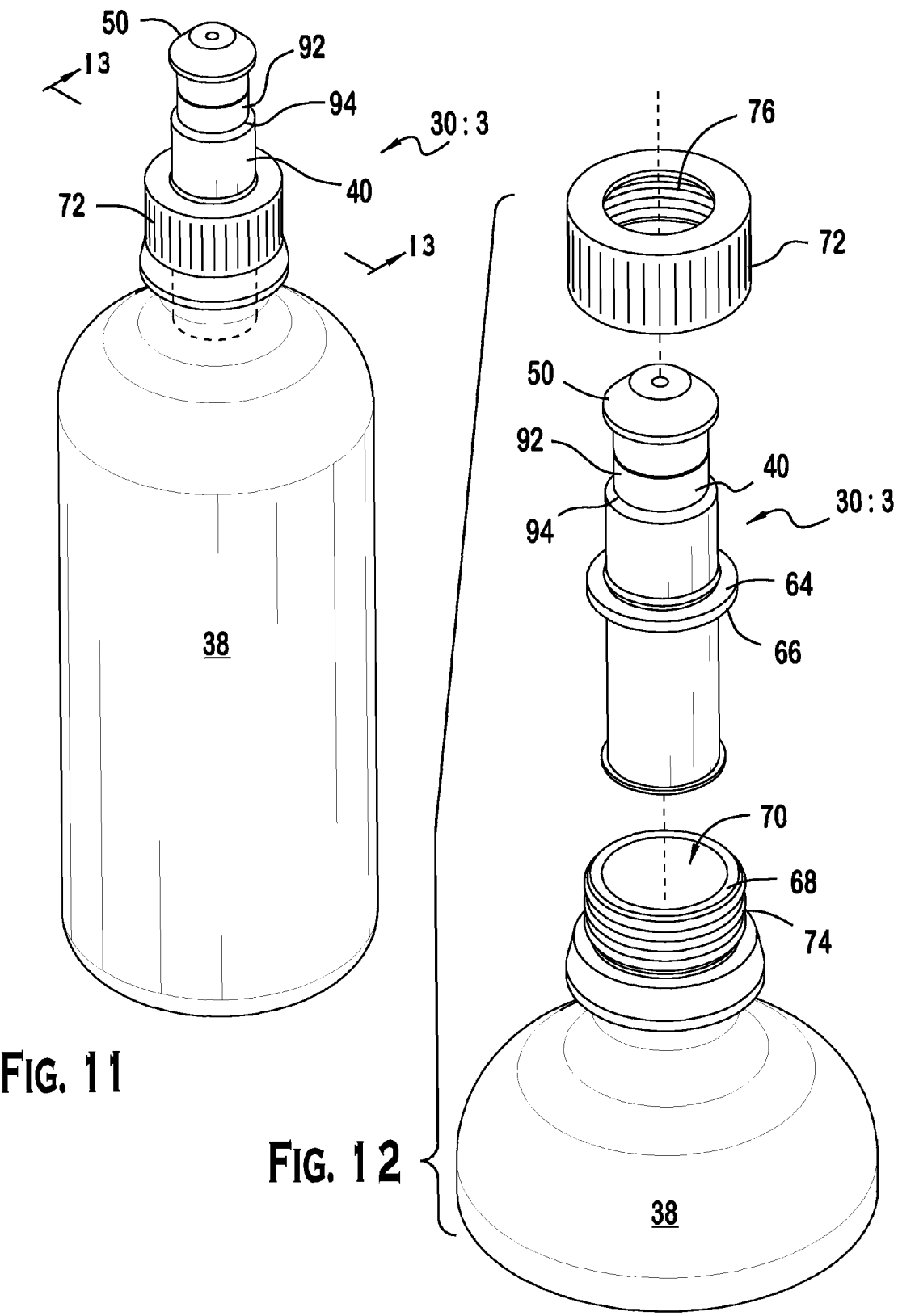

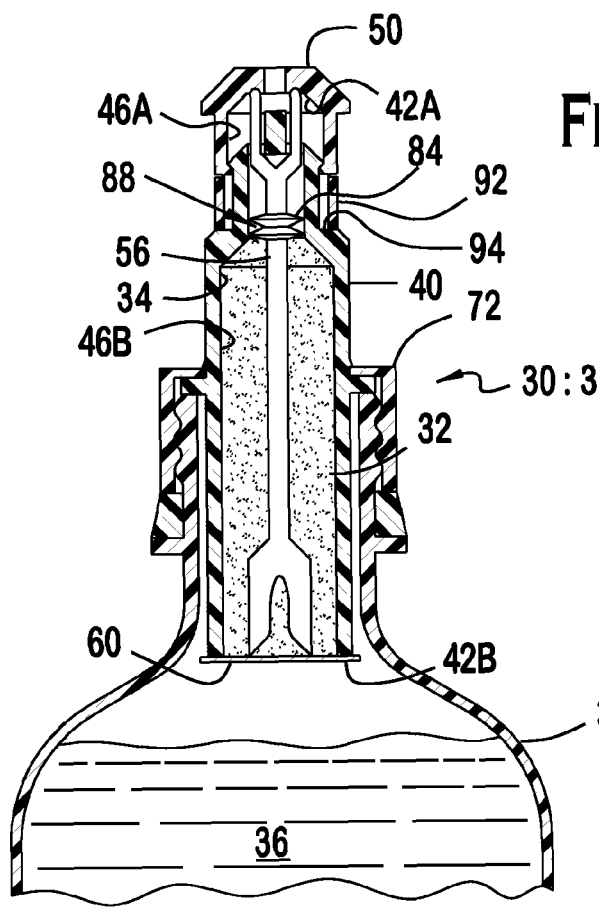
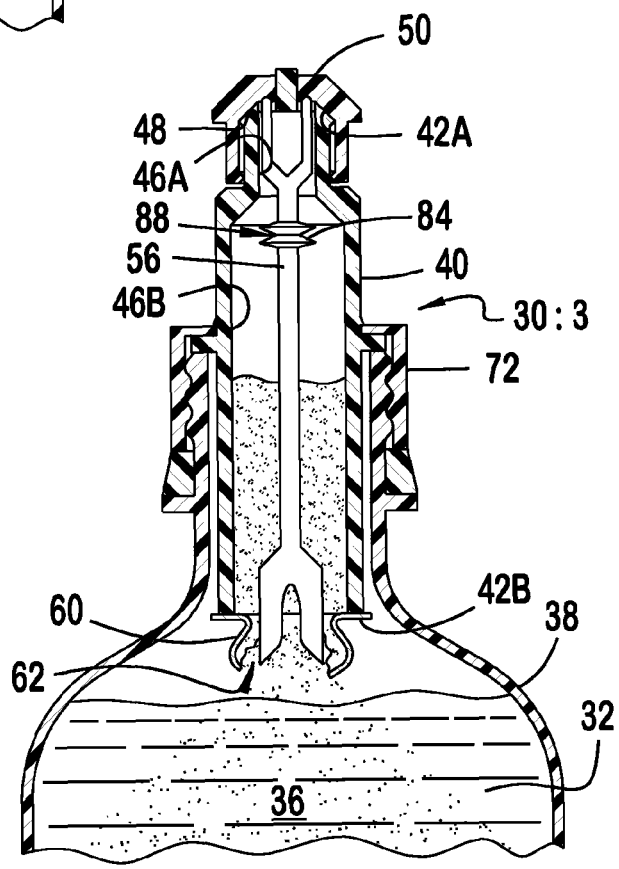

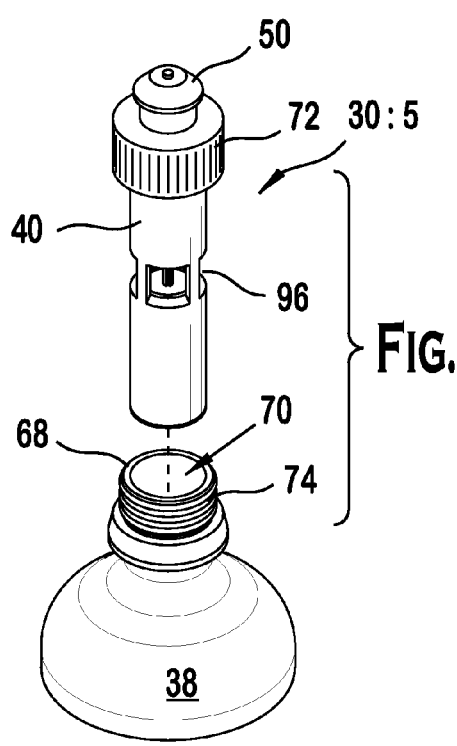
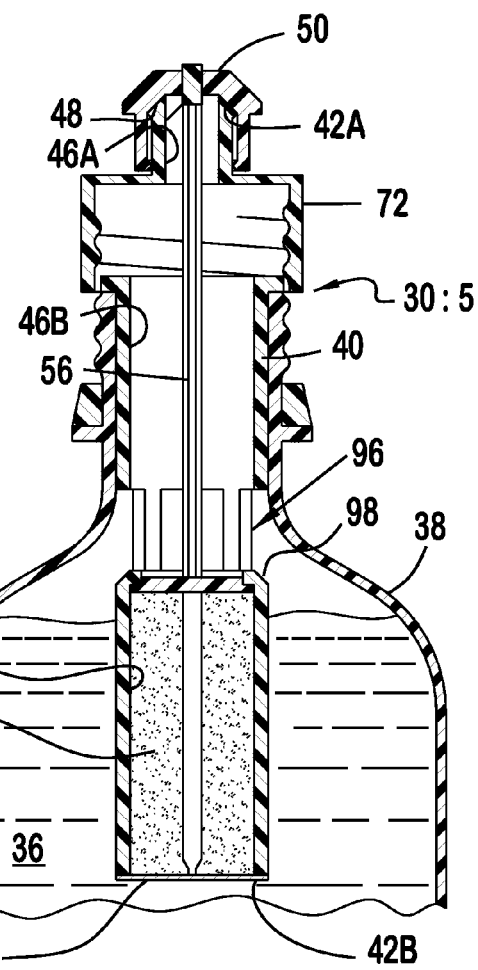
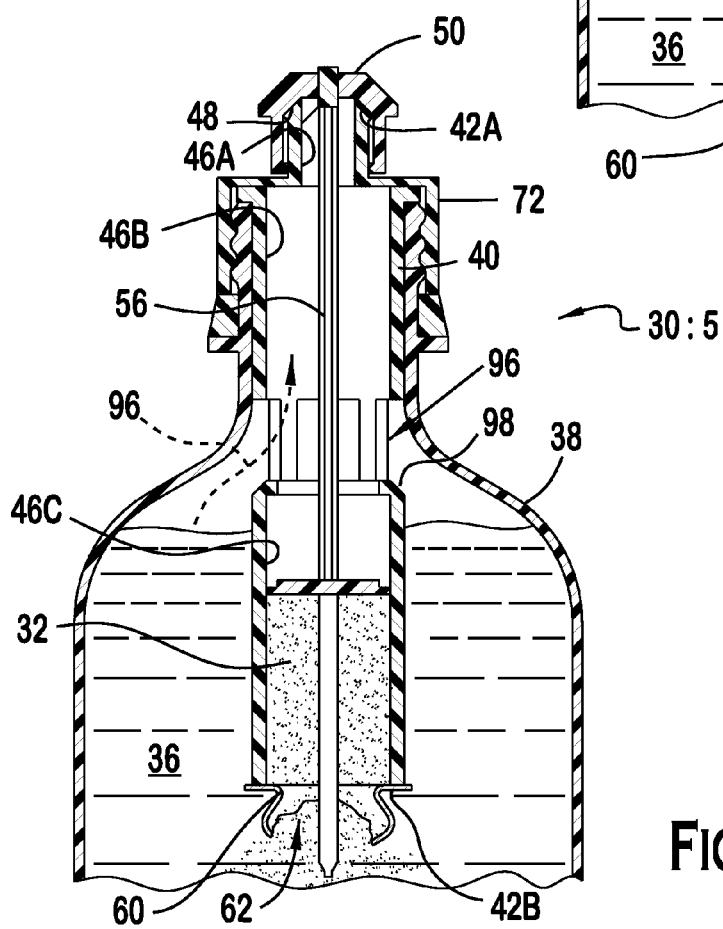
FIG. 17
FIG. 18
FIG. 19

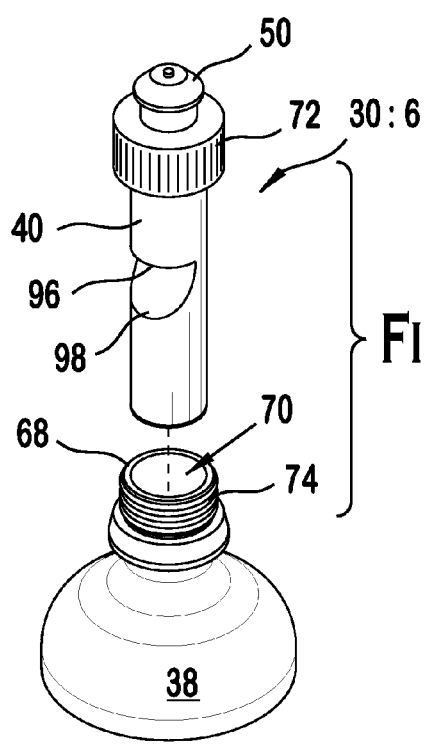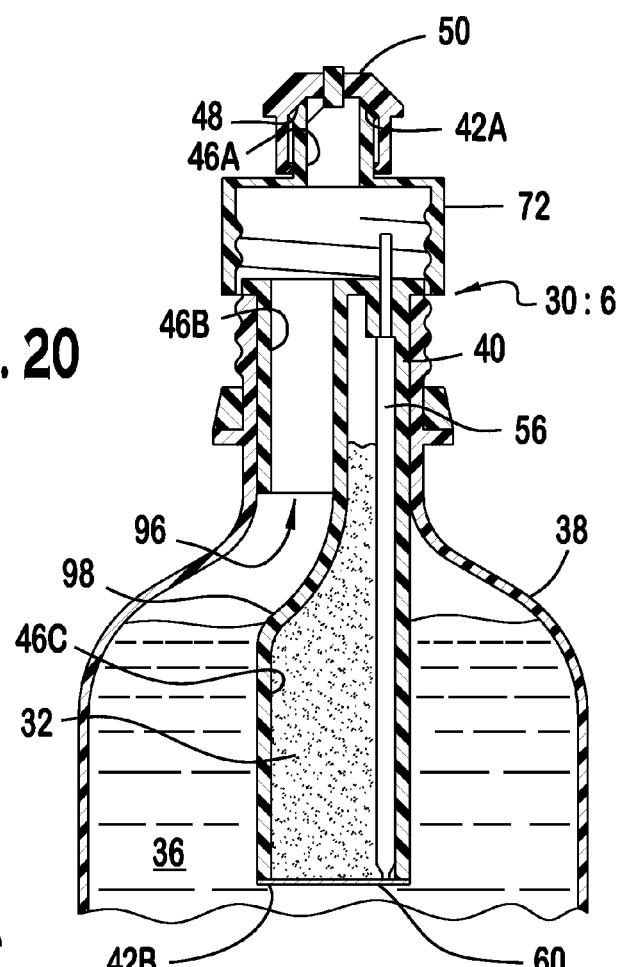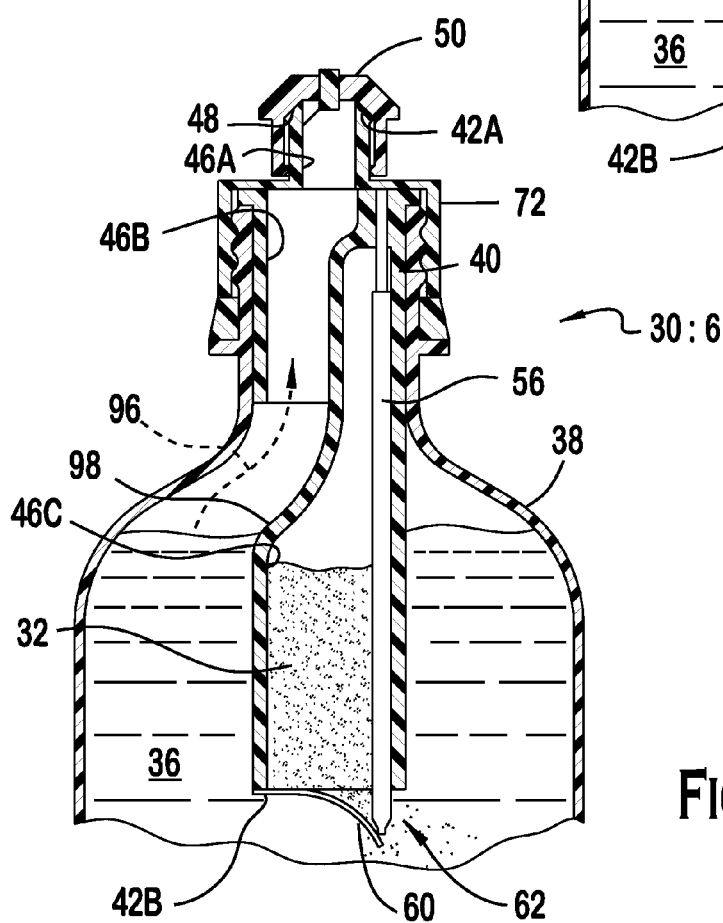
FIG. 20
FIG. 21
FIG. 22

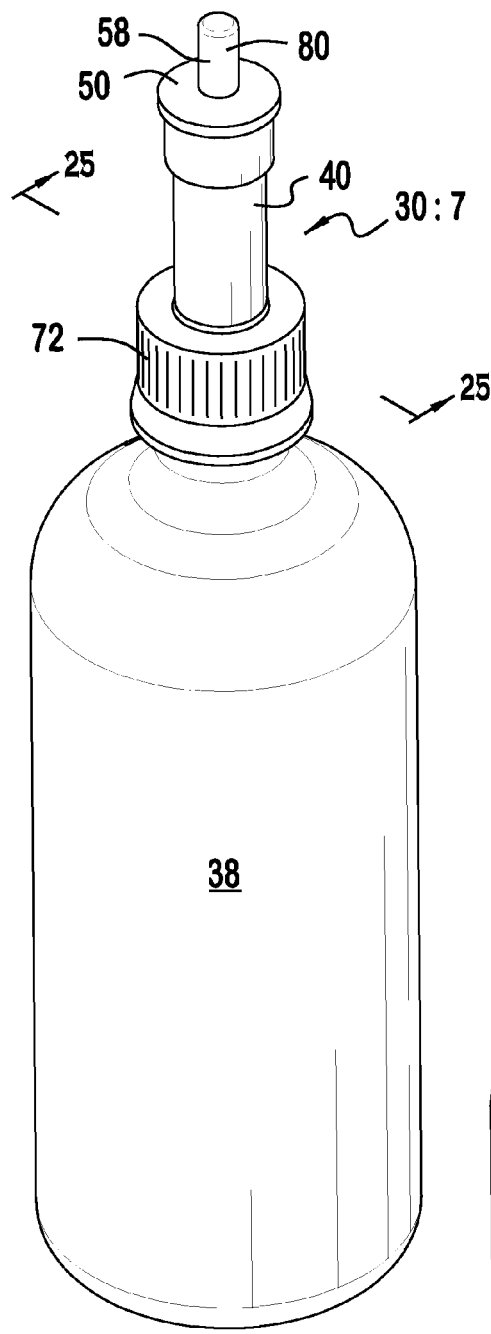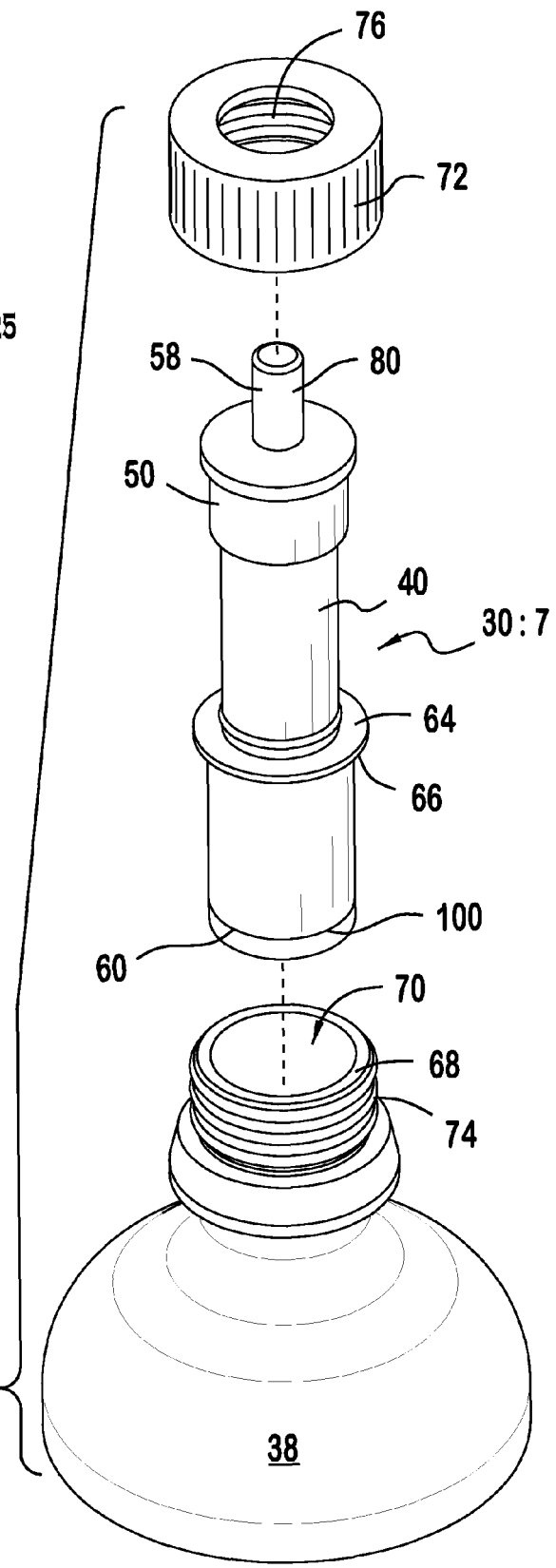
FIG. 23
FIG. 24

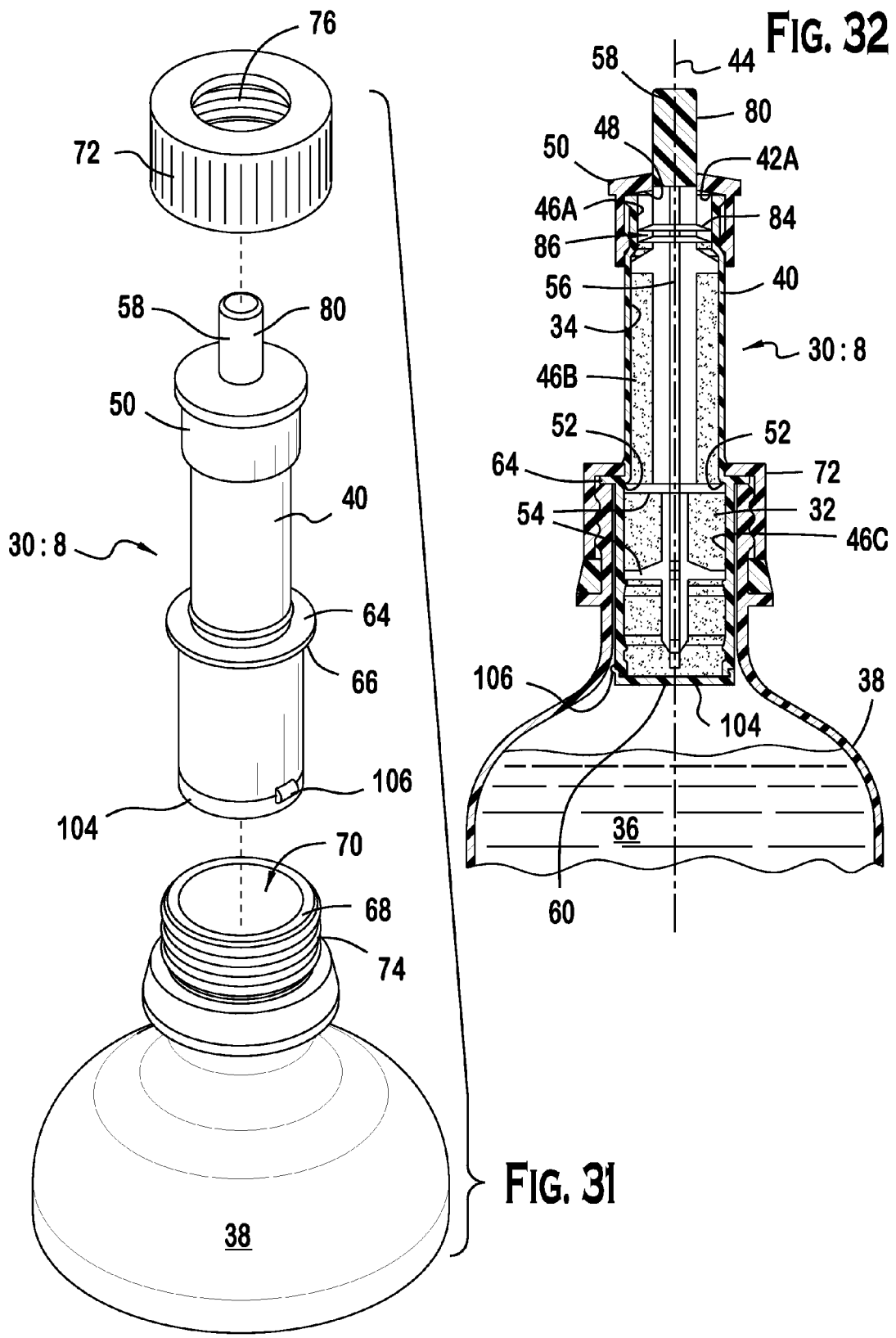

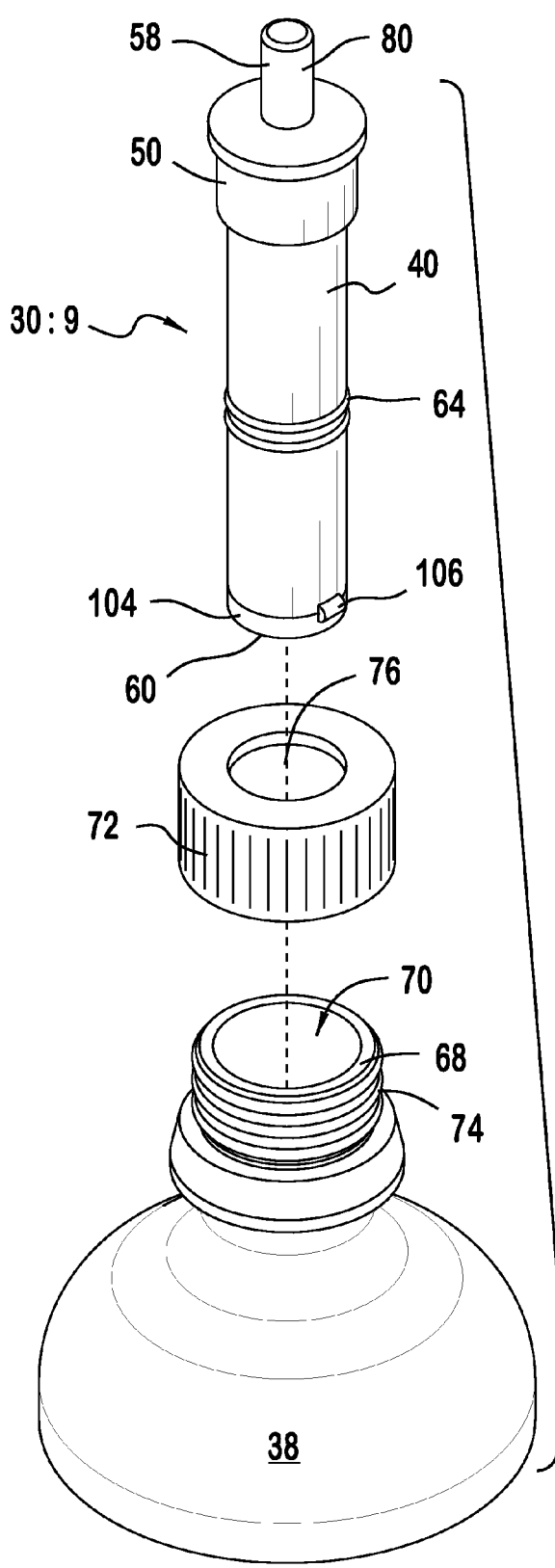
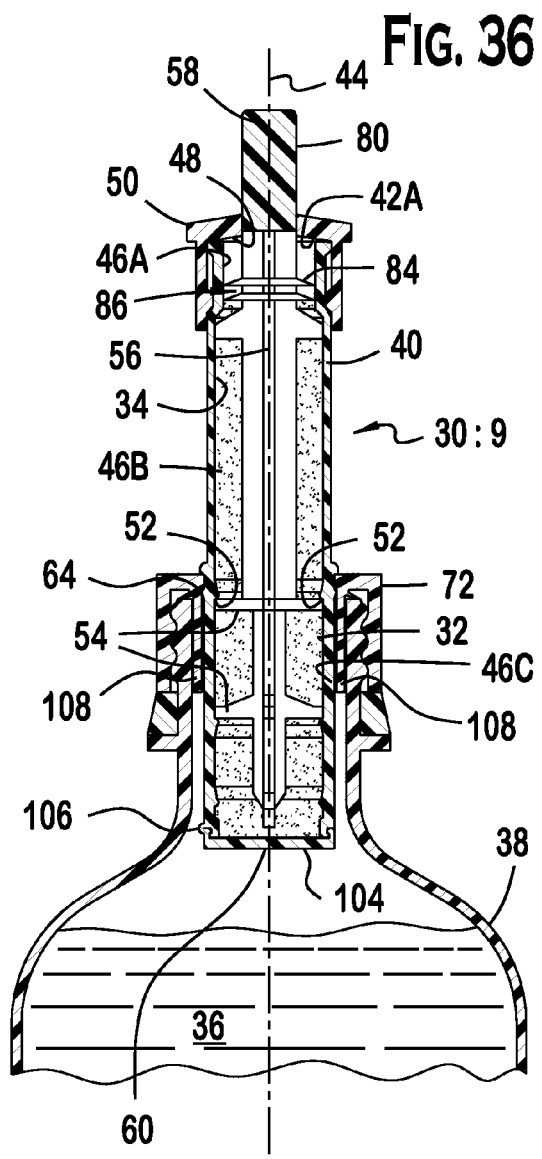

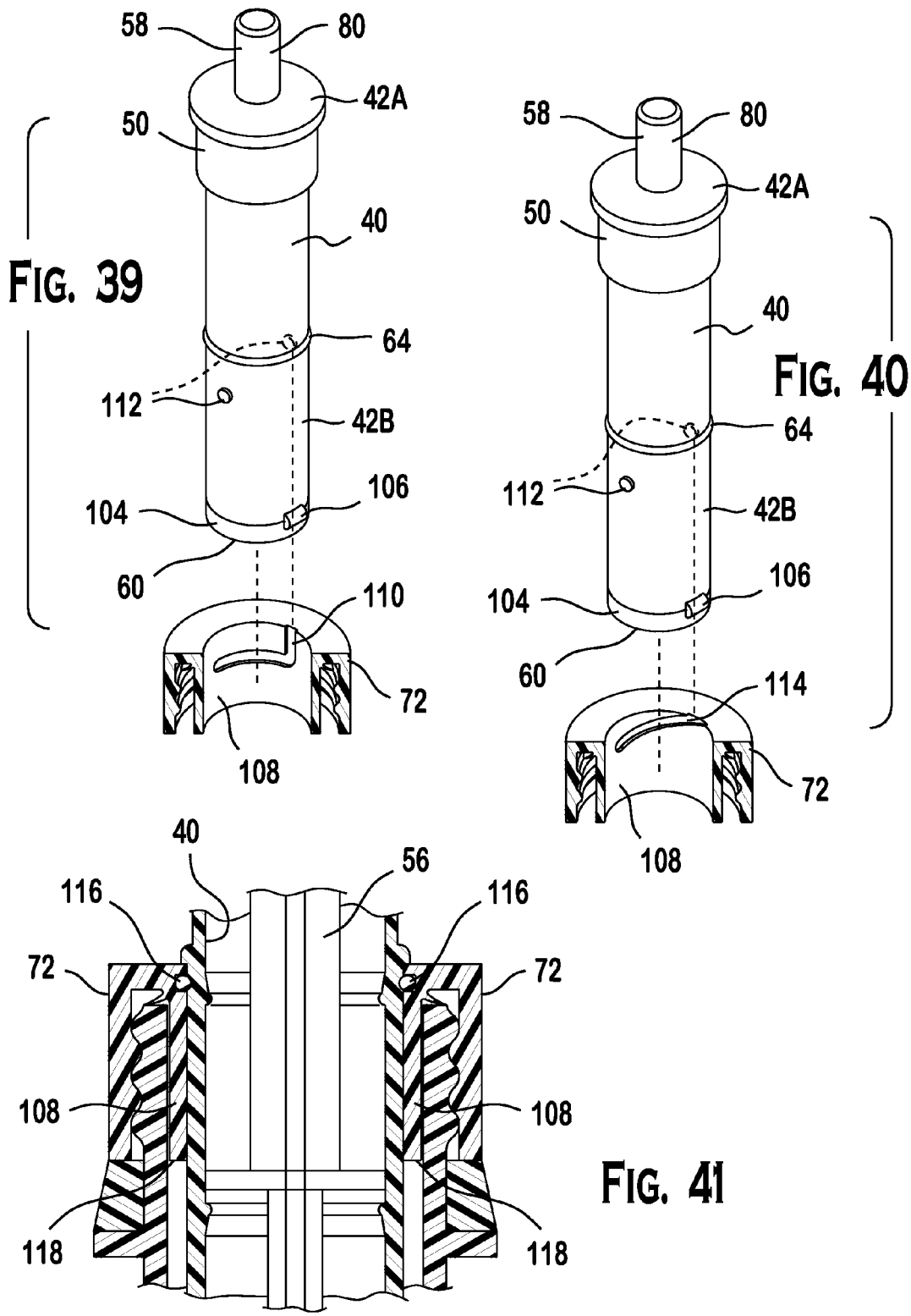

FLAVORING COMPONENT HOLDING DISPENSER FOR USE WITH CONSUMABLE BEVERAGES

CROSS REFERENCE TO RELATED APPLICATIONS

This application is a continuation-in-part of and claims priority to U.S. patent application Ser. No. 11/019,488, filed Dec. 22, 2004, which is a continuation of and claims priority to U.S. patent application Ser. No. 10/361,269, filed Feb. 10, 2003, now U.S. Pat. No. 6,959,839; priority to each of the above-identified patents is claimed and each of the above identified patents is incorporated by reference herein as if fully set forth in its entirety.

BACKGROUND

The present invention is directed generally to consumable beverage dispensers for use with bottles and, more specifically, to a consumable beverage dispenser capable of holding a flavoring component for selective mixing with a consumable beverage.

Sports or drink bottles have significant advantages over prior disposable cups with lids and even over conventional beverage cans and bottles. A drinking bottle is typically constructed of resilient, flexible plastic material which is more durable than prior known drink containers and thus may be used during recreational activities or while driving a vehicle. Drink bottles having spouts or straws with capped ends provide additional advantages for convenient use in various environments. Unfortunately, such drink bottles are incapable of storing a flavoring component separate from the main consumable beverage until just prior to the initial consumption of the consumable beverage.

It would be advantageous to provide a dispenser containing a flavoring component capable of being dispensed just prior to initial consumption; that preferably uses a plunger to release the flavoring component; that preferably uses a plunger end to seal an opening in the bottle's cap; and that is simple to use.

SUMMARY

One embodiment of the present invention is directed to a dispenser for a bottle adapted to contain a consumable beverage. The dispenser is adapted for a person to drink from and is adapted to engage the bottle. The dispenser includes a dispenser body adapted to hold a flavoring component. The dispenser body has a first dispenser end, adapted for drinking therefrom, and has a second dispenser end, adapted to be engaged with the bottle. A plunger is slidably disposed at least partially within the dispenser body for movement from a first plunger position to a second plunger position, in which the plunger creates a passageway through the dispenser body. The passageway is adapted to allow the flavoring component from the dispenser body to mix with the consumable beverage in the bottle. A cap is slidably positioned on the first dispenser end of the dispenser body and defines a cap opening adapted to allow the person to drink the consumable beverage therefrom. The cap is moveable between a first cap position, in which the cap opening is proximate to the first dispenser end of the dispenser body, and a second cap position, in which the cap opening is spaced further from the first dispenser end than when the cap is in the first cap position. When the plunger is in the second plunger position and the cap is in the first cap position, the plunger end cooperates with the cap to seal the cap opening so that the dispenser is adapted to prevent the consumable beverage from leaving the bottle.

In a separate aspect, the present invention is directed to a dispenser for a bottle adapted to contain a consumable beverage. The dispenser is adapted for a person to drink from and is adapted to engage the bottle. The dispenser includes a dispenser body adapted to hold a flavoring component. The dispenser body has a first dispenser end, suitable for drinking therefrom, and has a second dispenser end, adapted to be engaged with the bottle. A cap is slidably positioned on the first dispenser end of the dispenser body and defines a cap opening adapted to allow the person to drink the consumable beverage therefrom, the cap having an inner cap surface. A removable member is disposed about the dispenser body and is adapted to prevent the cap from sliding from a second cap position, in which the inner cap surface is spaced from the first dispenser end, to a first cap position, in which the inner cap surface is at least in close proximity to the first dispenser end. A plunger is slidably disposed at least partially within the dispenser body for movement from a first plunger position, in which the plunger generally extends between the inner cap surface and the second dispenser end, to a second plunger position, in which the plunger creates a passageway through the dispenser body. The passageway is adapted to allow the flavoring component from the chamber to mix with the consumable beverage in the bottle. When the removable member is displaced from about the dispenser body, the cap can be moved into the first cap position to drive the plunger from the first plunger position to the second plunger position.

In a separate aspect, the present invention is directed to a reusable dispenser for a bottle adapted to contain a consumable beverage. The dispenser is adapted for a person to drink from and being adapted to engage the bottle. The dispenser includes a dispenser body adapted to hold a flavoring component. The dispenser body having a first dispenser end, adapted for drinking therefrom, and having a second dispenser end, adapted to be engaged with the bottle. A plunger is slidably disposed at least partially within the dispenser body for movement from a first plunger position to a second plunger position, in which the plunger creates a passageway through the dispenser body. The passageway is adapted to allow the flavoring component from the chamber to mix with the consumable beverage in the bottle. A cap is slidably positioned on the first dispenser end of the dispenser body and defines a cap opening adapted to allow the person to drink the consumable beverage therefrom, the cap being moveable between a first cap position, in which the cap opening is proximate to the first dispenser end of the dispenser body, and a second cap position, in which the cap opening is spaced further from the first dispenser end than when the cap is in the first cap position. When the plunger is in the second plunger position and the cap is in the first cap position, the plunger end cooperates with the cap to seal the cap opening so that the dispenser is adapted to prevent the consumable beverage from leaving the bottle. The dispenser body is configured so that the passageway, after being created by the plunger, can be closed so that the dispenser is adapted to be reused.

In a separate aspect, the present invention is directed toward a dispenser for a bottle that is adapted to contain a consumable beverage. The dispenser is adapted for a person to drink from and is adapted to engage the bottle. The dispenser includes a dispenser body defining a chamber therein. The chamber is adapted to hold a flavoring component. The dispenser body has a first dispenser end, suitable for drinking therefrom, and has a second dispenser end, adapted to be positioned within the bottle when the dispenser is engaged with the bottle. The plunger is slidably disposed at least partially within the dispenser body for movement from a first plunger position, in which a plunger end extends outwardly from the first dispenser end of the dispenser body, to a second plunger position, in which the plunger penetrates a portion of the dispenser body to create a passageway. The passageway is adapted to allow the flavoring component from the chamber to mix with the consumable beverage. A cap is slidably positioned on the first dispenser end of the dispenser body and defines a cap opening adapted to allow a person to drink the consumable beverage therefrom. The cap is moveable between a first cap position, in which the cap opening is proximate to the first dispenser end of the dispenser body, and a second cap position, in which the cap opening is spaced further from the first dispenser end than when the cap is in the first cap position. When the plunger is in the second plunger position and the cap is in the first cap position, the plunger end cooperates with the cap to seal the cap opening so that the dispenser is adapted to prevent the consumable beverage from leaving the bottle.

In a separate aspect, the present invention is directed to a dispenser for a bottle adapted to contain a consumable beverage. The dispenser is adapted for a person to drink from and is adapted to engage the bottle. The dispenser includes a dispenser body defining a chamber therein. The chamber is adapted to hold a flavoring component. The dispenser body has a first dispenser end, suitable for drinking therefrom, and has a second dispenser end, adapted to be positioned within the bottle when the dispenser is engaged with the bottle. A cap is slidably positioned on the first dispenser end of the dispenser body and defines a cap opening adapted to allow the person to drink the consumable beverage therefrom. The cap has an inner cap surface. A removable member is disposed about the dispenser body and is adapted to prevent the cap from sliding from a second cap position, in which the inner cap surface is spaced from the first dispenser end, to a first cap position, in which the inner cap surface is at least in close proximity to the first dispenser end. A plunger is slidably positioned at least partially within the dispenser body for movement from a first plunger position, in which the plunger generally extends between the inner cap surface and the second dispenser end, to a second plunger position, in which the plunger penetrates a portion of the dispenser body to create a passageway. The passageway is adapted to allow the flavoring component from the chamber to mix with the consumable beverage in the bottle. When the removable member is displaced from about the dispenser body, the cap can be moved into the first cap position to drive the plunger from the first plunger position to the second plunger position.

In a separate aspect, the present invention is directed to a dispenser for a bottle that is adapted to contain a consumable beverage. The dispenser is adapted for a person to drink from and is adapted to engage the bottle. The dispenser includes a dispenser body defining a chamber therein. The chamber is adapted to hold a flavoring component. The dispenser body has a first dispenser end, suitable for drinking therefrom, and has a second dispenser end, adapted to be positioned within the bottle when the dispenser is engaged with the bottle. The dispenser body has a consumable beverage passageway extending between the first dispenser end and a portion of a dispenser outer surface adapted to be located within the bottle when the dispenser is engaged with the bottle. A plunger is at least partially slidably disposed within the dispenser body such that when the dispenser is secured to the bottle, the dispenser body drives the plunger to penetrate a portion of the dispenser body to create a passageway, the passageway being adapted to allow the flavoring component from the chamber to mix with the consumable beverage in the bottle. Wherein the consumable beverage passageway is adapted to allow the consumable beverage and/or the flavoring component to pass through the dispenser to the first dispenser end.

BRIEF DESCRIPTION OF THE DRAWINGS

The foregoing summary, as well as the following detailed description of the preferred embodiments of the present invention, will be better understood when read in conjunction with the appended drawings. For the purpose of illustrating the invention, there are shown in the drawings embodiments which are presently preferred. It is understood, however, that the invention is not limited to the precise arrangements and instrumentalities shown. In the drawings:

FIG. 11 is a perspective view of a dispenser according to a third preferred embodiment of the present invention secured to the bottle;

FIG. 12 is an exploded view of the dispenser of FIG. 11;

FIG. 13 is a cross-sectional view of the dispenser of FIG. 11 as taken along the line 13-13 of FIG. 11 and illustrates a removable member maintaining the cap in the second cap position with the plunger in a first plunger position in which the plunger generally extends between an inner cap surface and the second dispenser end;

FIG. 14 is a cross-sectional view of the dispenser of FIG. 11, similar to that of FIG. 13, and illustrates the dispenser with the removable member detached such that the cap can be moved into the first cap position to drive the plunger into a second plunger position in which the plunger penetrates the dispenser body to form a passageway between the chamber and the interior of the bottle;

FIG. 17 is a perspective view of a dispenser according to a fifth preferred embodiment of the present invention prior to being secured to the bottle;

FIG. 18 is a cross-sectional view of the dispenser of FIG. 17 secured to the bottle and illustrates the plunger in a first plunger position;

FIG. 19 is a cross-sectional view of the dispenser of FIG. 17, similar to that of FIG. 18 and illustrates the plunger after the dispenser body has driven the plunger to penetrate a portion of the dispenser body during the securing of the dispenser body to the bottle;

FIG. 20 is a perspective view of a dispenser according to a sixth preferred embodiment of the present invention prior to securing the dispenser to the bottle;

FIG. 21 is a cross-sectional view of the dispenser of FIG. 20 and illustrates the dispenser just prior to the engagement of the dispenser to the bottle;

FIG. 22 illustrates the dispenser of FIG. 20 with the plunger in the second position after being driven by a portion of the dispenser body during the securing the dispenser body to the bottle;

FIG. 23 is a perspective view of a dispenser according to a seventh preferred embodiment of the present invention illustrating the dispenser mounted on the bottle which is adapted to contain a consumable beverage;

FIG. 24 is an exploded view of the dispenser of FIG. 23 which is preferably configured to be reusable; The tubular sleeve may be slidably positionable over the dispenser to secure the dispenser lip to an upper edge of an outer surface of the bottle that defines a bottle mouth therein;

FIG. 31 is a perspective view of a dispenser according to an eighth preferred embodiment of the present invention prior to insertion in the bottle;

FIG. 32 is cross-sectional view of the dispenser of FIG. 31 mounted to the bottle and illustrates the dispenser having a recloseable lid positioned on the bottom thereof to allow the flavoring component to be dispensed; the lid can preferably be reattached after the dispenser has been refilled after use;

FIG. 35 is a perspective view of a dispenser according to a ninth preferred embodiment of the present invention secured to the bottle; The dispenser is preferably inserted into the tubular sleeve after the tubular sleeve has been attached to the bottle; This allows the dispenser to be slid in and out of the bottle with minimum manipulation to facilitate swapping dispensers during use or to facilitate the selection of an individual dispenser prior to consumption of the bottle contents;

FIG. 36 is a cross-sectional view of the dispenser of FIG. 35 and illustrates the connection between the dispenser and a portion of the tubular sleeve based on a preferred double lip that extends around the dispenser; Alternatively, the connection can be a twist lock, detent, snap fit, tongue and groove, friction fit, or any other suitable connection without departing from the scope of the present invention.

FIG. 39 illustrates a dispenser of FIG. 35 and a broken away portion of the tubular sleeve; the dispenser has a post thereon for engaging a groove along an inner surface of the portion of the sleeve; The post and groove combine to form a twist lock connection;

FIG. 40 illustrates the dispenser of FIG. 35 and a broken away portion of the tubular sleeve; the dispenser has a post thereon for engaging a generally spiral slot along an inner surface of the portion of the sleeve; and FIG. 41 is a partial cross-sectional view of the dispenser engaged with the tubular sleeve; The inner portion of the tubular sleeve tapers inwardly in a generally conical fashion to provide an interference fit with the dispenser; The tubular sleeve preferably includes a gasket along an upper part of the inner portion to facilitate a fluid tight connection.

DETAILED DESCRIPTION OF THE PREFERRED EMBODIMENTS

Figures 1, 2:
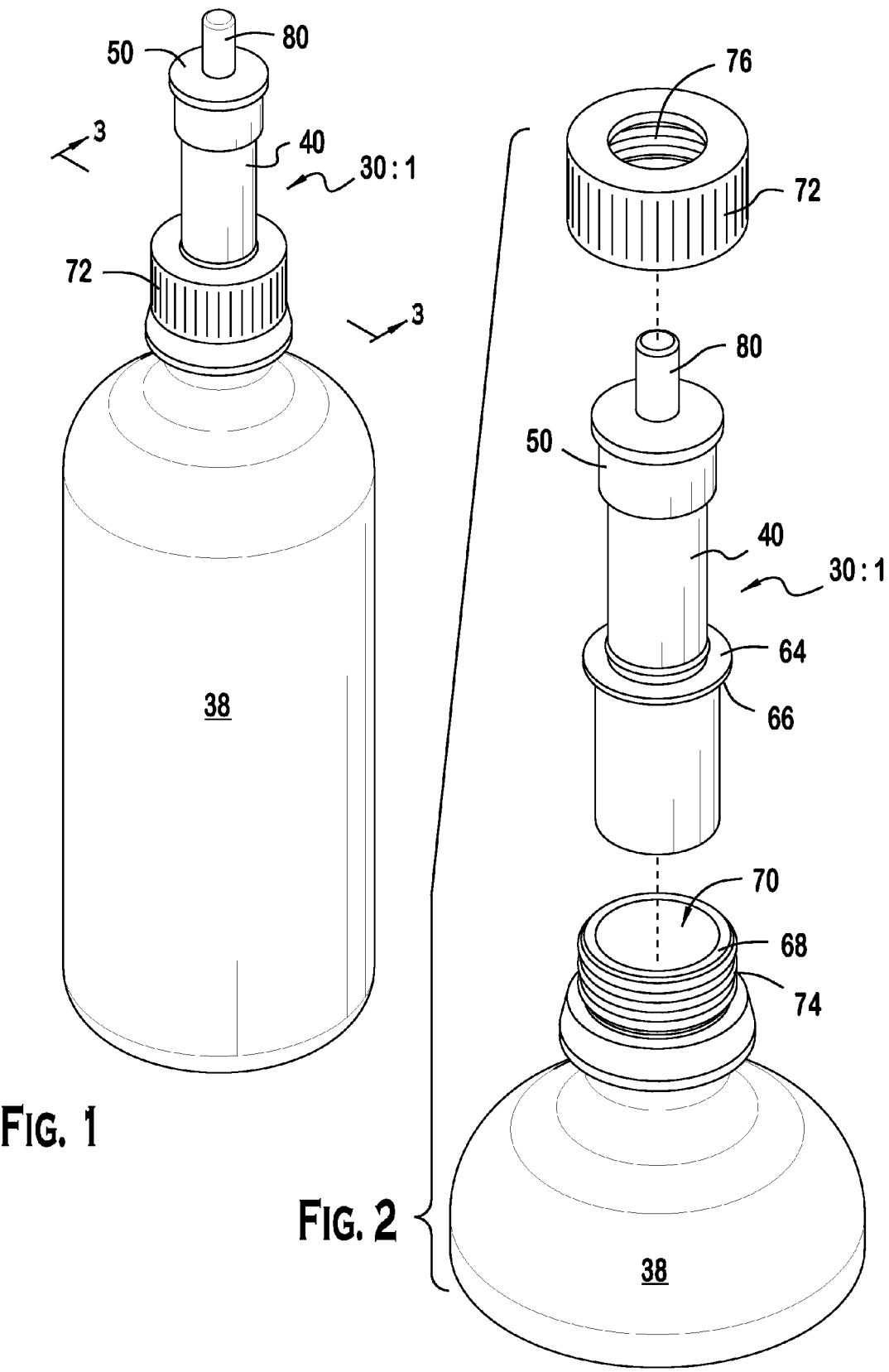
FIG. 1 is a perspective view of a dispenser according to a first preferred embodiment of the present invention illustrating the dispenser mounted on a bottle adapted to contain a consumable beverage.
FIG. 2 is an exploded view of the dispenser of FIG. 1 illustrating a tubular sleeve that is slidably positionable over the dispenser to secure a dispenser lip to an upper edge of an outer surface of the bottle that defines a bottle mouth therein.

Certain terminology is used in the following description for convenience only and is not limiting. The words "right,"

"left," "top," and "bottom" designate directions in the drawings to which reference is made. The words "inwardly" and "outwardly" refer to directions toward and away from, respectively, the geometric center of the dispenser and designated parts thereof. The term "flavoring component", as used in the claims and in the corresponding portions of the specification, is defined as meaning "a juice concentrate, a drink mix, a drink powder, a vitamin mix, a protein powder, a liquid containing caffeine, a flavoring element, a coloring element, a dye, a food coloring, or the like." The words "a" and "one" are defined as including one or more of the referenced item unless specifically stated otherwise. This terminology includes the words above specifically mentioned, derivatives thereof, and words of similar import.

Referring to FIGS. 1-41, wherein like numerals indicate like elements throughout, nine preferred embodiments of a dispenser according to the present invention are shown and generally designated 30:1-30:9, respectively. Briefly stated, the dispenser 30:1-30:9 is adapted to contain a flavoring component 32 in a chamber 34 within a dispenser body 40. The flavoring component 32 is preferably selectively dispensed into a consumable beverage 36 contained in a bottle 38 to which the dispenser 30:1-30:9 is attached.

Many of the features of the dispenser 30:1-30:9 of the present invention are similar and operate in a generally similar fashion. For simplicity, the first preferred dispenser 30:1 will be described and, thereafter, only the differences between the first preferred dispenser 30:1 and the remaining preferred dispensers 30:2-30:9 will be discussed. Accordingly, it is understood that those features discussed in connection with any one of the embodiments of the dispensers 30:1-30:9 will operate generally the same in the remaining embodiments unless otherwise described. Additionally, it is understood from this disclosure that the various features shown in the drawings and described in the specification can be interchanged without departing from the scope of the present invention.

It is preferred that the dispenser 30:1-30:9 is formed of a sturdy, non-reactive, durable, lightweight material, suitable for use with beverages, such as a suitable polymer. However, those of ordinary skill in the art will appreciate from this disclosure that any known material suitable for use with consumable beverages be can used without departing from the scope of the present invention.

Figure 3:
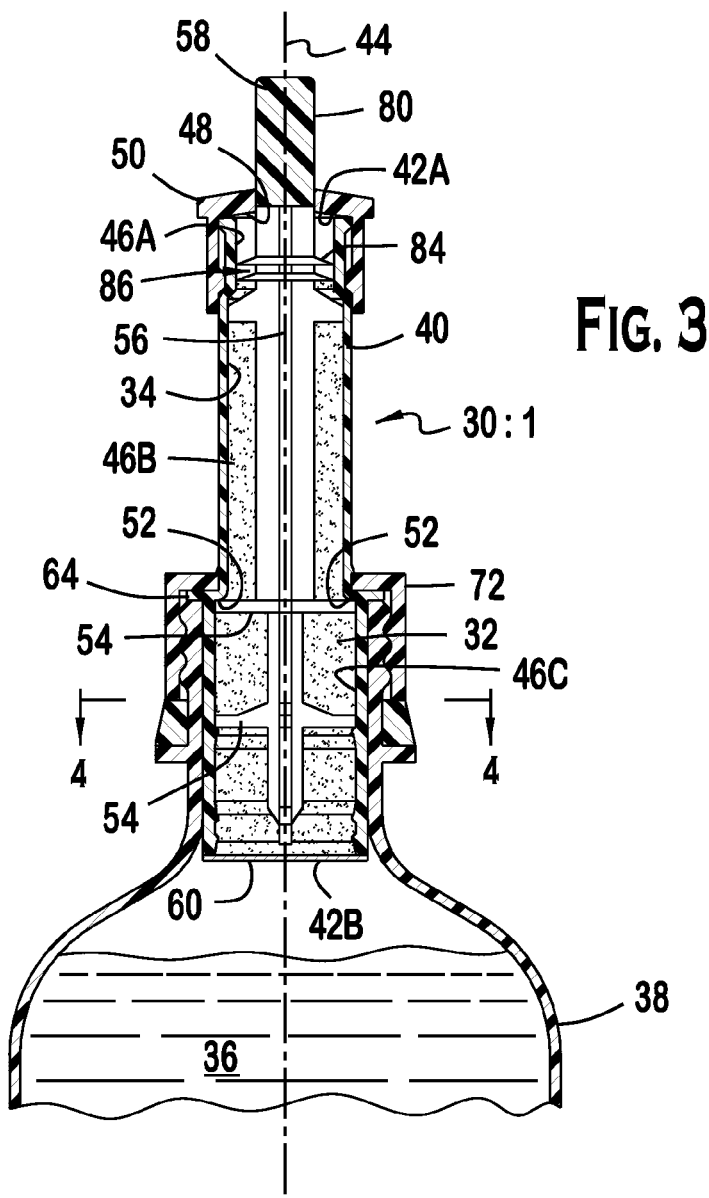
FIG. 3 is a cross-sectional view of the dispenser of FIG. 1 as taken along the line 3-3 of FIG. 1 and illustrates a plunger in a first plunger position with a plunger end extending outwardly from the first dispenser end of the dispenser body.

Referring to FIGS. 1-6, one embodiment of the dispenser 30:1 of the present invention is adapted for a person to drink from and is adapted to engage the bottle 38. The dispenser 30:1 includes the dispenser body 40 that defines the chamber 34 therein. The chamber 34 is adapted to hold the flavoring component 32. The dispenser body 40 is preferably formed in a cylindrical fashion. Referring specifically to FIG. 3, the dispenser body 40 may have a longitudinal axis 44. The chamber 34 preferably has at least first and second chamber sections 46A, 46B. The first chamber section includes a first dispenser end 42A.

The first chamber cross-section, as measured perpendicular to the longitudinal axis 44, is preferably greater than a second chamber cross-section, as measured perpendicular to the longitudinal axis 44. That is, the first chamber section 46A is preferably located at the top of the chamber 34 with a side that is bounded by an inner surface 48 of a cap 50. The second chamber section 46B is preferably located adjacent to the first chamber section 42A. It is preferred that the first and second chamber sections 46A, 46B are cylindrical. Referring to the lower portion of the chamber 34, it is preferred that the chamber 34 include a chamber shoulder 52 that is adapted to abut at least one guide projection 54 (further described below) to prevent a plunger 56 (further described below) from being completely withdrawn from the dispenser body 40.

The chamber shoulder 52 can be formed at an interface between the second chamber section 46B and a third chamber section 46C. The third chamber section 46C preferably has a third chamber cross-section, as measured perpendicularly to the longitudinal axis 44, that is greater than the second chamber cross-section.

As detailed above, the first dispenser end 42A is preferably open. The first end 42A of the dispenser is substantially closed by the cap 50 positioned on the first dispenser 42A. While a particular shape has been described above for the chamber 34 contained in the dispenser body 40, those of ordinary skill in the art will appreciate from this disclosure that the dimensions and shape of the chamber 34 can be varied without departing from scope of the present invention.

Figure 6:
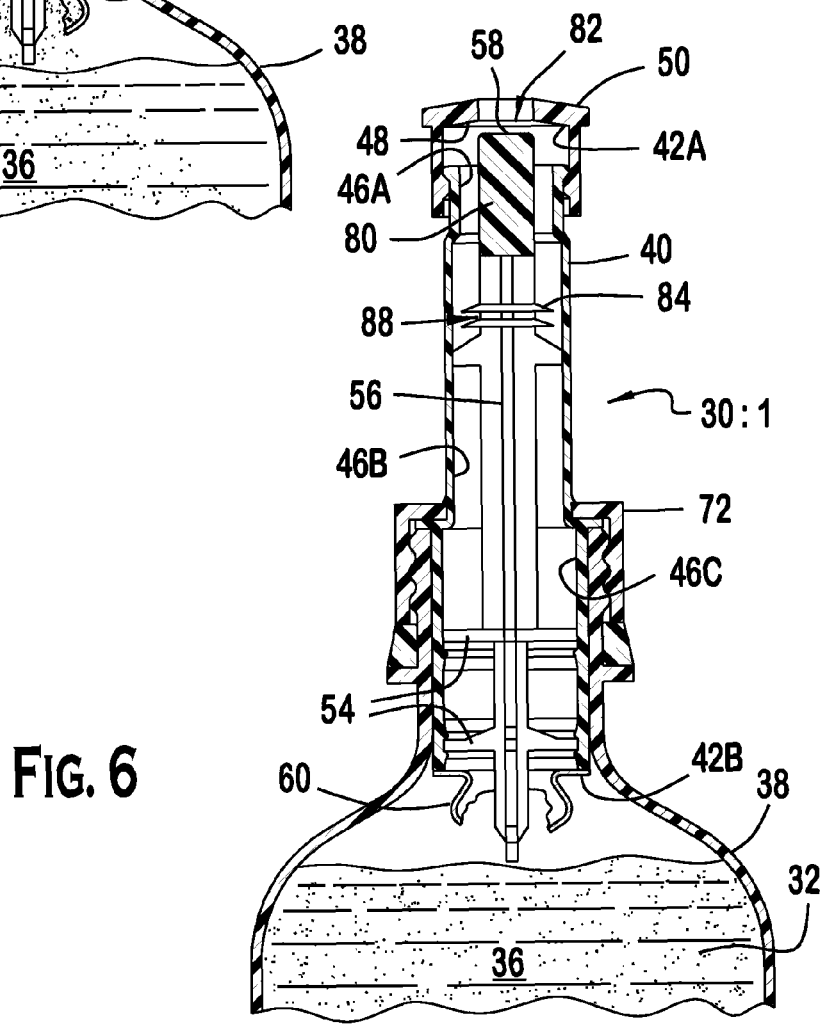
FIG. 6 is a cross-sectional view of the dispenser of FIG. 1 similar to that of FIG. 3, illustrating the cap in the second cap position for drinking therefrom.

Referring to FIG. 6, the dispenser body has a first dispenser end 42A suitable for drinking therefrom. The dispenser has a second dispenser end 42B that is adapted to be positioned within the bottle 38 when the dispenser 30:1 is engaged with the bottle 38. While the second end 42B is generally shown as only slightly protruding past the neck of the bottle 38, those of ordinary skill in the art will appreciate from this disclosure that the amount of penetration of the second dispenser end 42B into the bottle 38 can vary without departing from the scope of the present invention.

The dispenser body 40 preferably includes a penetrable section 60 disposed on the second dispenser end 42B. As best shown in FIG. 2, the dispenser body 40 also preferably includes an outwardly directed dispenser lip 64 that forms a dispenser shoulder 66 that is adapted to be seated on a bottle surface 68 that defines a bottle opening 70.

Figure 7:
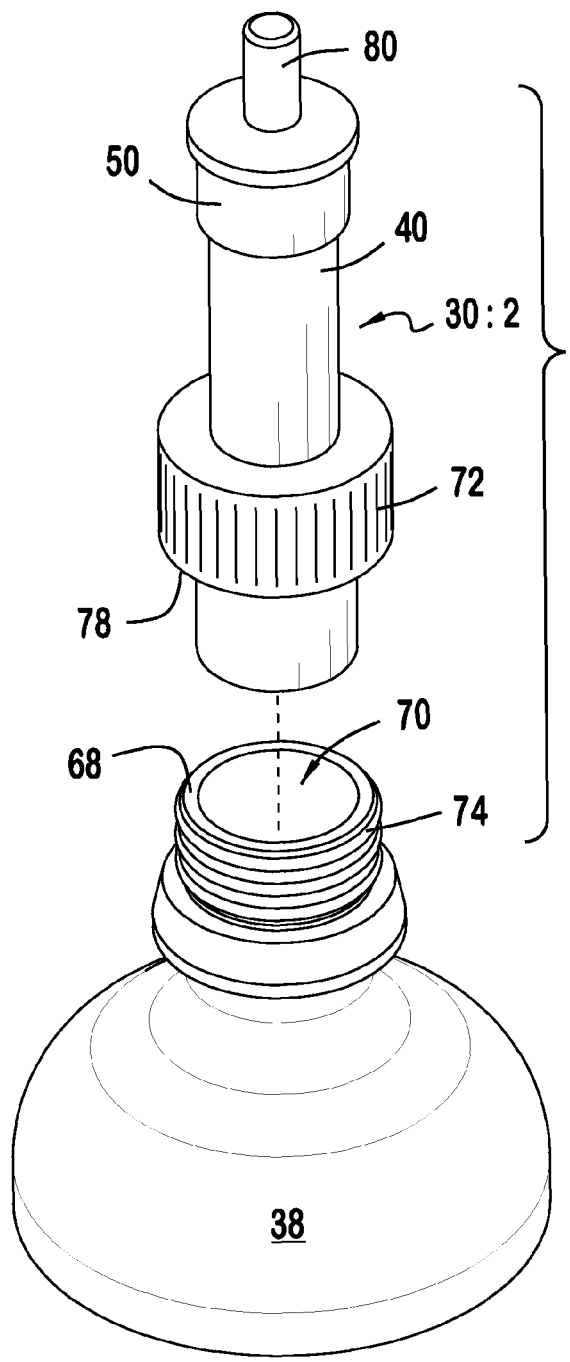
FIG. 7 is a perspective view of a dispenser according to a second preferred embodiment of the present invention prior to insertion in the bottle.
Figure 8:
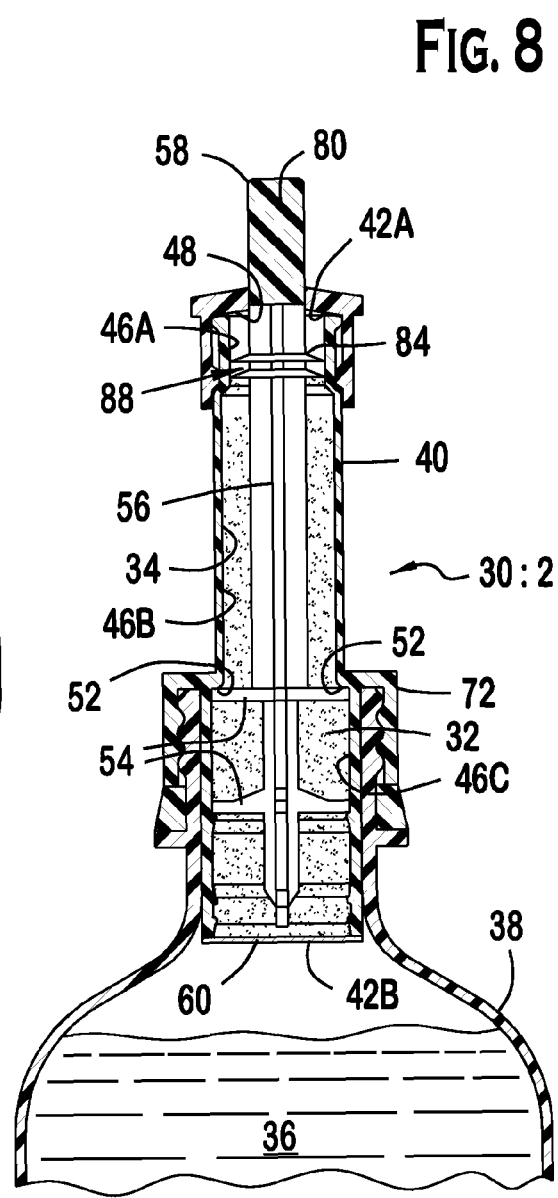
FIG. 8 is cross-sectional view of the dispenser of FIG. 7 mounted to the bottle and illustrates the tubular sleeve being integrally formed with the dispenser body such that tubular sleeve is disposed over and spaced from a portion of the dispenser body to create a perimeter groove around the dispenser body that is adapted to receive a portion of the bottle and that defines a bottle opening.
Figure 9:
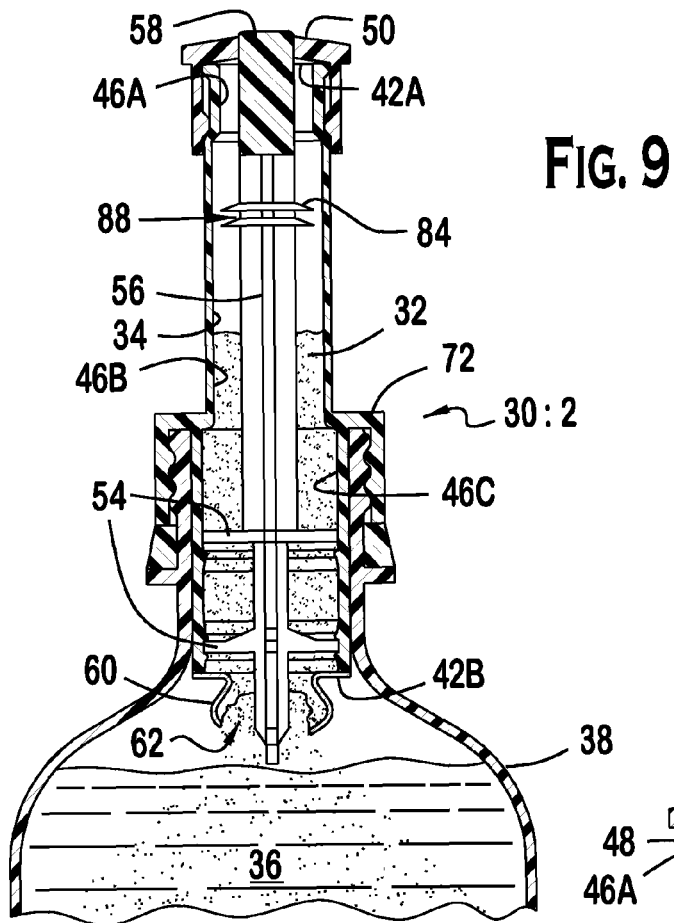
FIG. 9 is cross-sectional view of the dispenser of FIG. 7, similar to that of FIG. 8, and illustrates the plunger in the second plunger position and the cap in the first cap position.
Figure 10:
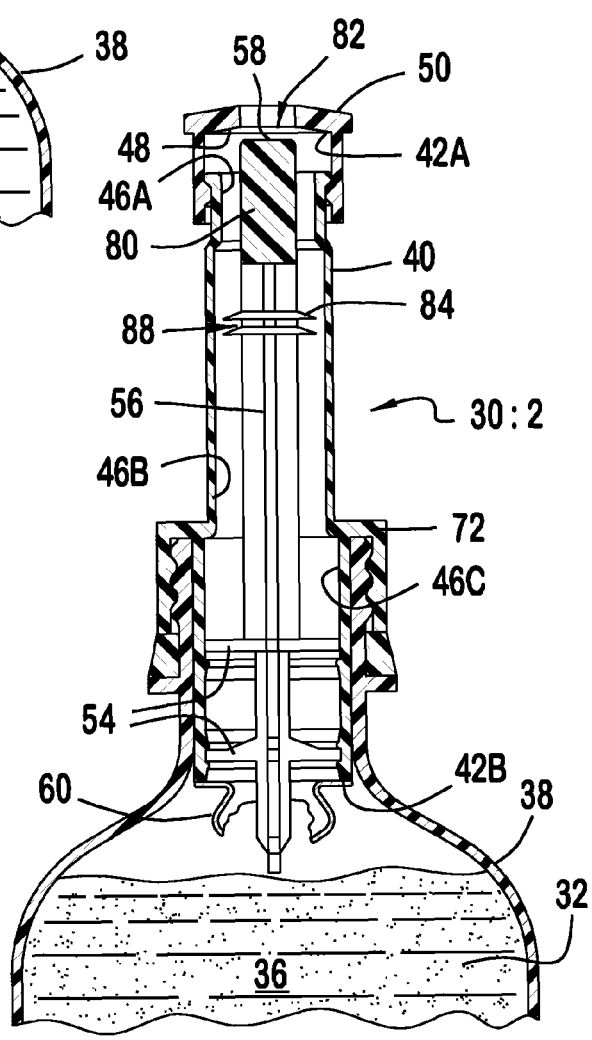
FIG. 10 is a cross-sectional view of the dispenser of FIG. 7 with the plunger in the second plunger position and the cap in the first cap position.
Figure 15:
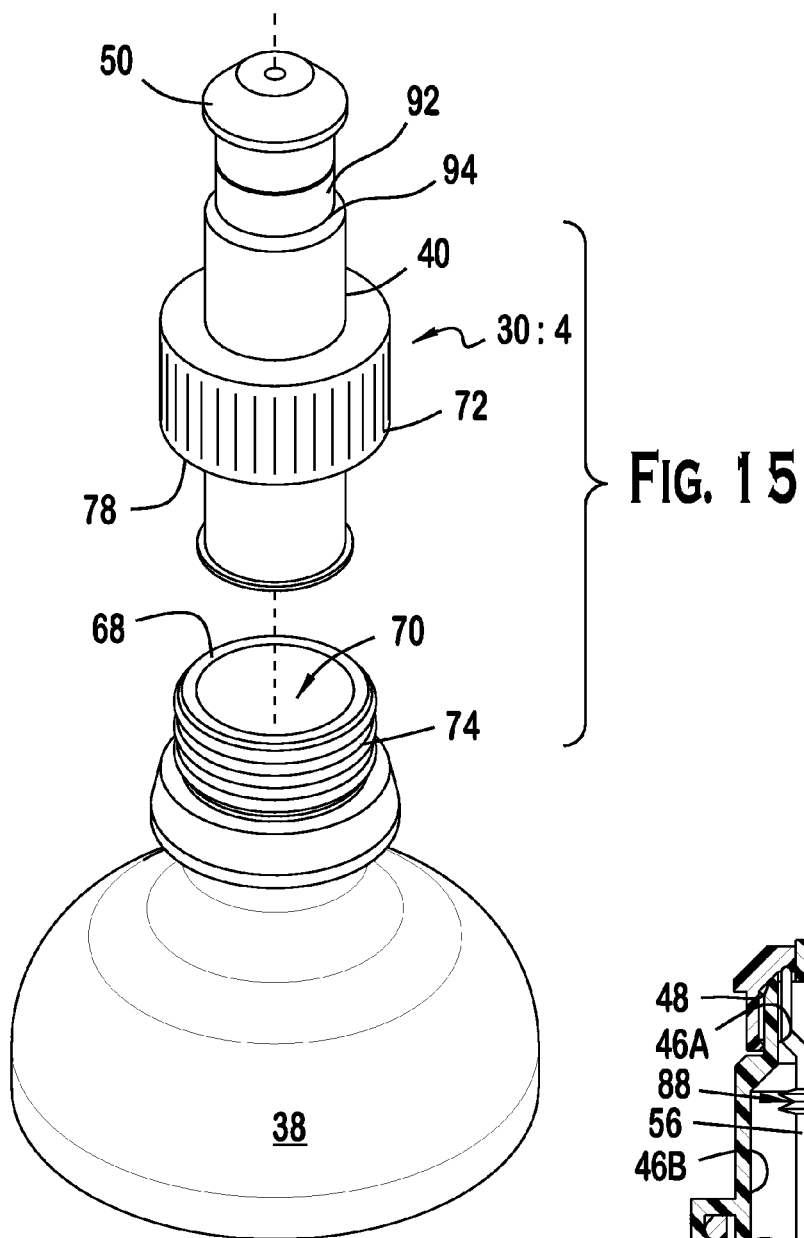
FIG. 15 is a perspective view of a dispenser according to a fourth preferred embodiment of the present invention illustrating the dispenser prior to being to secured to the bottle.
Figure 16:
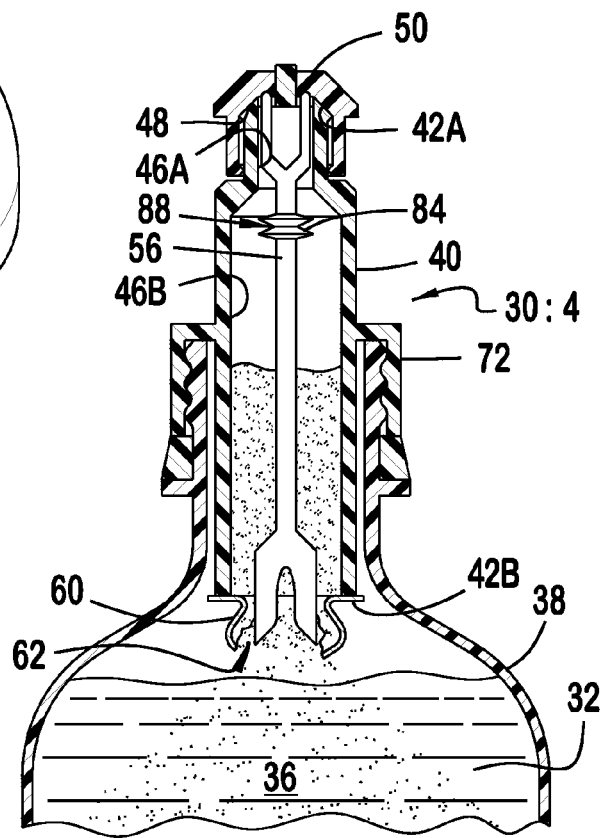
FIG. 16 is a cross-sectional view of the dispenser of FIG. 15 secured to the bottle and illustrates the cap in the first cap position with the plunger in the second plunger position.
Figure 25:
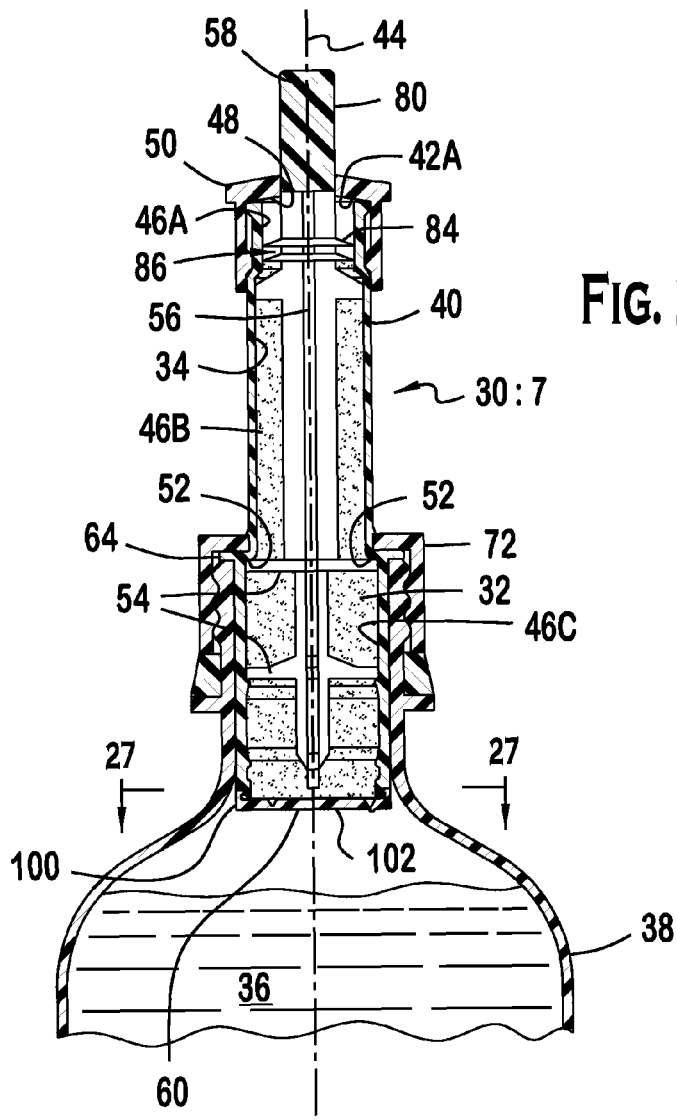
FIG. 25 is a cross-sectional view of the dispenser of FIG. 23 as taken along the line 25-25 of FIG. 23 and illustrates the recloseable cap in the closed position on the bottom of the dispenser with the plunger in a first plunger position.
Figure 26:
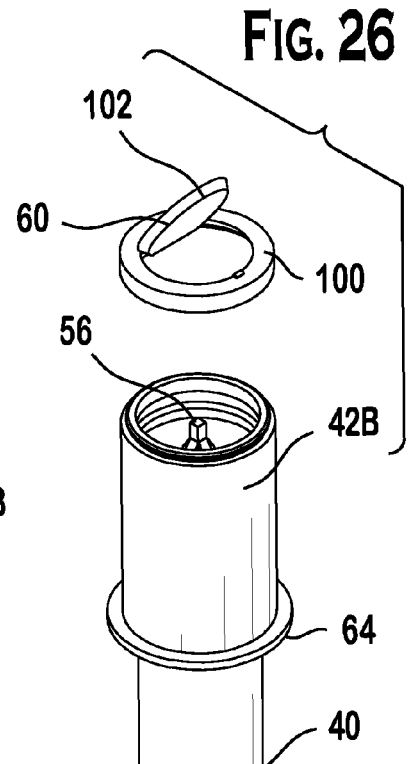
FIG. 26 is a partially exploded view of the dispenser of FIG. 23 showing the recloseable cap separate from the dispenser and having a panel that is in an open position to allow the contents of the dispenser to be released therefrom; The recloseable cap can be integrally formed with the dispenser bottom or any other suitable mechanism for making the dispenser reusable can be used without departing from the scope of the present invention.
Figure 27:
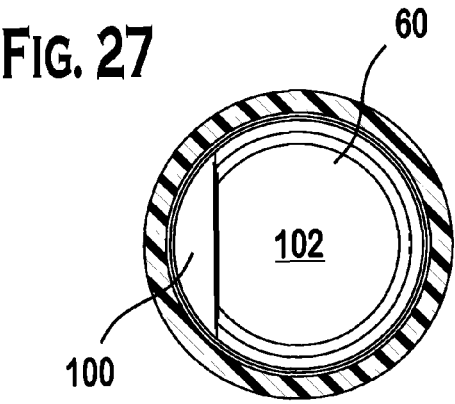
FIG. 27 is a cross-sectional view of the dispenser of FIG. 25 as taken along the line 27-27 in FIG. 25 and illustrates the panel in the closed position.
Figure 28:
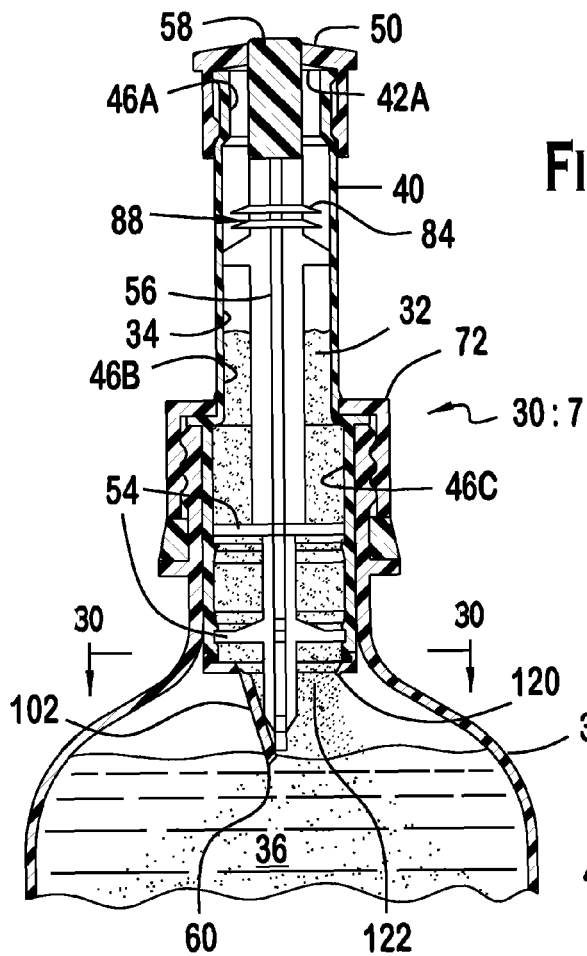
FIG. 28 is a cross-sectional view similar to that of FIG. 25 that shows the dispenser of FIG. 23 with the plunger in the second plunger position with the panel abutted, dislodged, penetrated by the plunger, or moved; The panel is in the open position which allows the flavoring component of the dispenser to mix with the consumable beverage; The cap is in the first cap position which generally prevents drinking from the bottle.
Figure 30:
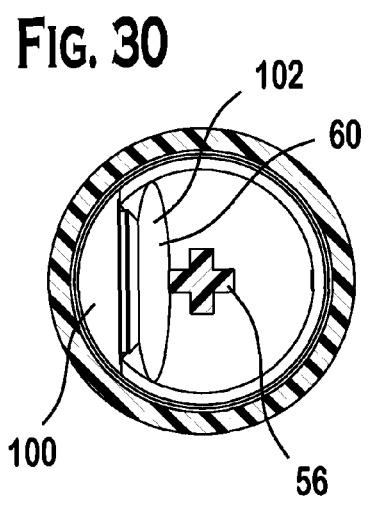
FIG. 30 is a cross-sectional view of the dispenser of FIG. 28 taken along the line 30-30 of FIG. 28 and illustrates the panel in the open position.
Figure 29:
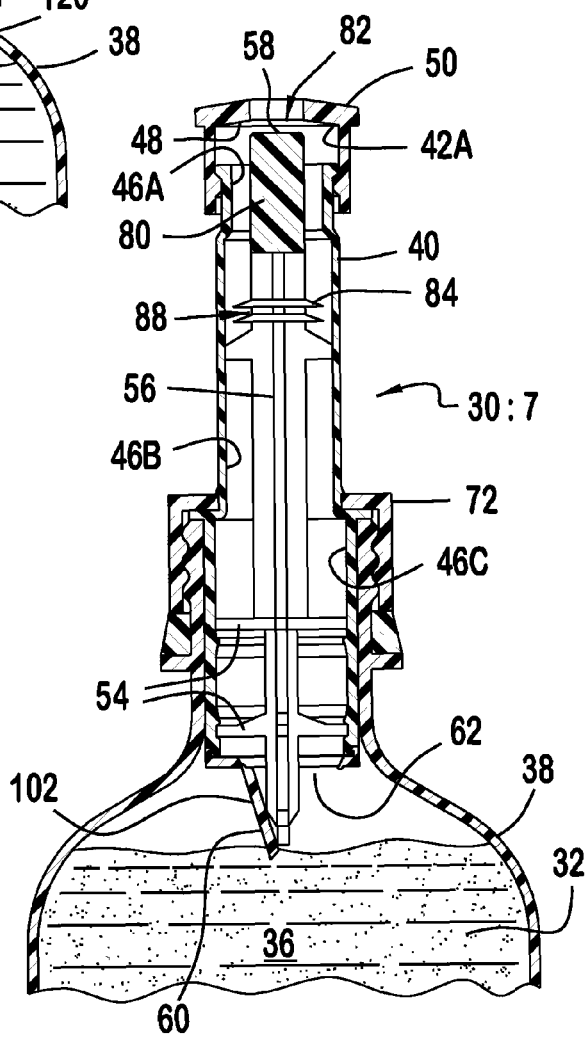
FIG. 29 is a cross-sectional view similar to that of FIG. 28 of the dispenser of FIG. 23 showing the cap in the second cap position for drinking therefrom.

It is preferable that a tubular sleeve 72 is slidably engagable over the dispenser 30:1 to secure the dispenser 30:1 at least partially in the bottle opening 70. The tubular sleeve 72 is preferably threadably engagable with the bottle 38 via the engagement of at least one sleeve thread 76 with at least one bottle thread 74. Referring to FIG. 7, alternatively, the tubular sleeve 72 can be integrally formed with the dispenser body 40 such that the tubular sleeve is disposed over and spaced from a portion of the dispenser 40 to create a perimeter groove 78 around the dispenser body 40 that is adapted to receive the portion of the bottle surface 68 that defines the bottle opening 70.

Figure 5:
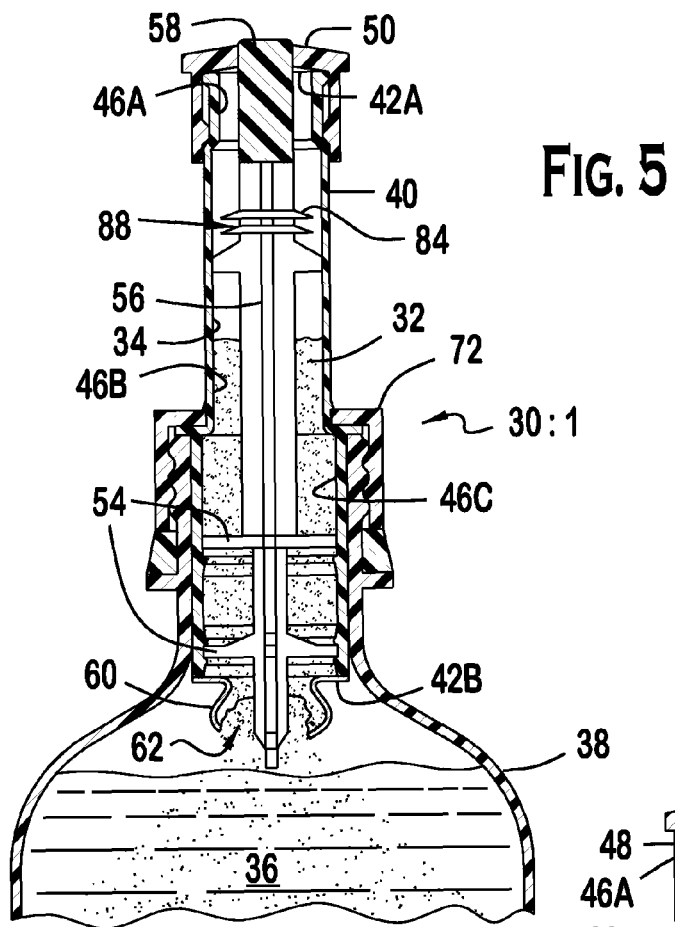
FIG. 5 is a cross-sectional view of the dispenser of FIG. 1, similar to that of FIG. 3, and illustrates the plunger in a second plunger position such that the plunger has penetrated a portion of the dispenser body to allow the flavoring component to mix with the consumable beverage and illustrates the cap in a first cap position such that the plunger end cooperates with the cap to seal the cap opening and to prevent the flow of consumable beverage or flavoring component through the dispenser.

Referring to FIGS. 3, 5, and 6, the plunger 56 is slidably disposed at least partially within the dispenser body 40 for movement from a first plunger position (shown in FIG. 3), in which a plunger end 58 extends outwardly from the first dispenser end 42A of the dispenser body 40, to a second a plunger position (shown in FIGS. 5 and 6), in which the plunger 56 penetrates a portion 60 of the dispenser body 40 to create a passageway 62. The passageway 62 is adapted to allow the flavoring component 32 from the chamber 34 to mix with the consumable beverage 36 in the bottle 38.

It is preferred that the plunger end 58 forms a button 80 that, while the plunger 56 is in the first plunger position, is adapted for a person to depress (i.e., to move inwardly) to allow the flavoring component 32 to mix with the consumable beverage 36. The button 80 can have any shape depending upon the desired cap opening 82 (that preferable correlation is further described below).

Referring to FIGS. 3 and 5, the plunger 56 preferably includes at least one gasket 84 extending outwardly therefrom. The at least one gasket 84 preferably forms a chamber seal 86 (shown in FIG. 3) between the plunger 56 and an inner chamber surface 48 along the first chamber section 46A when the plunger 56 is in the first plunger position (as shown in FIG.

3). The chamber seal 86 is adapted to prevent the flavoring component 32 from being dispensed through the cap 50. This simplifies transportation and handling of the dispenser 30:1 prior to use.

The at least one gasket 84 is preferably spaced from the inner chamber surface along the second chamber section 46B when the plunger 56 is in the second position (shown in FIGS. 5 and 6) to form a chamber passageway 88. The chamber passageway 88 is adapted to allow the flavoring component 32 and/or the consumable beverage 36 to flow through the chamber 34 toward the cap 50. The chamber passageway 88 preferably extends generally about the perimeter of the at least one gasket 84 due to the increased cross-sectional area of the second chamber section 46B relative to the first chamber section 46A. It is preferred that the plunger 56 include at least one guide projection 54 that extends outwardly therefrom and slidably abuts the inner chamber surface 48.

Figure 4:
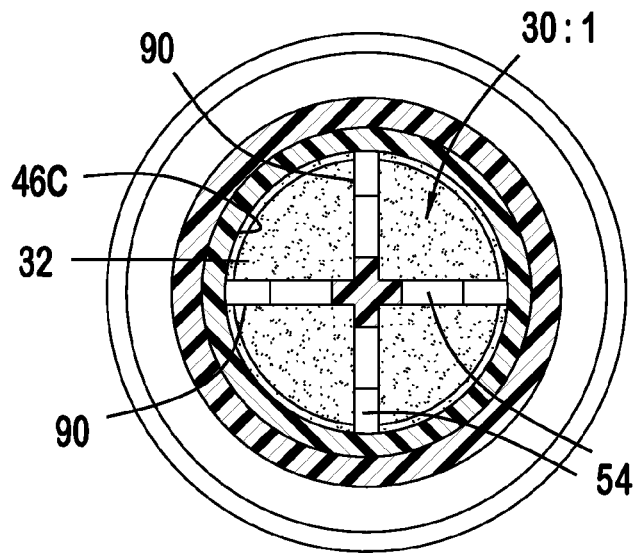
FIG. 4 is a cross-sectional view of the dispenser of FIG. 3 as taken along the line 4-4 of FIG. 3 and illustrates at least one guide projection that extends outwardly from the plunger and slidably abuts an inner chamber surface to maintain the proper alignment of the plunger within the chamber.

Referring specifically to FIG. 4, it is preferred that the guide projection 54 comprise four fins 90 that are spaced generally equidistantly about the plunger 56. Those of ordinary skill in the art will appreciate that any guide projection 54 design can be used provided that the flavoring component 32 and/or the consumable beverage 36 can pass by the guide projection(s) 54. Depending upon the interference fit between the guide projections 54 and the inner chamber surface 48, the amount of force necessary to move the plunger 56 from the first plunger position to the second plunger position can be customized to customer taste.

Referring to FIGS. 5 and 6, the cap 50 is slidably positioned on the first dispenser end 42A of the dispenser body and defines a cap opening 82 adapted to allow a person to drink the consumable beverage 36 therefrom. It is preferable that the cap 50 is slidable upwardly and downwardly on the dispenser 40. The cap is moveable between a first cap position (shown in FIG. 5), in which the cap opening 82 is proximate to the first dispenser end 42A of the dispenser body 40, and a second cap position (shown in FIG. 6) in which the cap opening 82 is spaced further from the first dispenser end 42A than when the cap 50 is in the first cap position.

Referring specifically to FIG. 5, when the plunger 56 is in the second plunger position and the cap 50 is in the first cap position, the plunger end 58 cooperates with the cap 50 to seal the cap opening 82 so that the dispenser 30:1 is adapted to prevent the consumable beverage 36 from leaving the bottle 38. Accordingly, the cap opening 82 can have any shape and it is preferable that the button 80 formed by the plunger end 58 of the plunger 56 is complimentarily shaped. Referring to FIGS. 7-10, the second preferred embodiment of the dispenser 30:2 is similar in design and operation to the first preferred dispenser 30:1, except for the tubular sleeve 72 is integrally formed with the dispenser body 40.

Referring to FIGS. 11-14, a third preferred embodiment of the dispenser 30:3 preferably includes a removable member 92 that is disposed about the dispenser body 40 and is adapted to prevent the cap 50 from sliding thereon. Referring specifically to FIG. 13, it is preferable that the removable member 92 is disposed beneath a bottom edge of the cap 50 and above an upper dispenser body shoulder 94. The cap 50 is slidable from a second cap position (shown in FIG. 13), in which the inner cap surface 48 is spaced from the first dispenser end 42A, to a first cap position (as shown in FIG. 14), in which the inner cap surface 48 is at least in close proximity to the first dispenser end 42A. Those of ordinary skill in the art will appreciate that the term "at least in close proximity" means "preferably abutting contact therebetween or within a reasonable tolerance, such as between approximately two (2) and four (4) millimeters or the like."

The plunger 56 is slidably disposed at least partially within the dispenser body for movement from a first plunger position (shown in FIG. 13), in which the plunger extends generally between the inner cap surface 48 and the second dispenser end 42B, to a second plunger position (shown in FIG. 14), in which the plunger 56 penetrates a portion 60 of the dispenser body 40 to create a passageway 62. The cap 50 can be moved into the first cap position to drive the plunger 56 from the first plunger position to the second plunger position to selectively disperse the flavoring component 32 into the bottle 38.

The fourth preferred dispenser 30:4 is substantially similar to third preferred dispenser 30:3, except that the tubular sleeve 72 is integrally formed with the dispenser body 40. Those of ordinary skill in art will appreciate from this disclosure that while a threaded tubular sleeve 72 is disclosed in each of the dispenser embodiments 30:1-30:6, that various methods of securing any of the dispensers 30:1-30:6 to the bottle 38 can be used without departing from the scope of the present invention. For example, the dispensers 30:1-30:6 can be sonically welded, integrally formed with a heat weld, hot wire welded, or adhesively fixed to the bottle 38 without departing from the scope of the present invention.

Referring to FIGS. 17-19, a fifth preferred embodiment of the dispenser 30:5 of the present invention includes a dispenser body having a consumable beverage passageway 96 extending between the first dispenser body end 42A and a portion of a dispenser outer surface 98 and is adapted to be located within the bottle 38 when the dispenser 30:5 is engaged with the bottle 38. Referring to FIGS. 20-22, it is preferred, but not necessary, that the chamber 34 not be in fluid communication with the first dispenser end 42A except for by following a liquid path through the consumable beverage 36 in the bottle and into the dispenser 40 via the portion of the dispenser outer surface 98 that opens to the consumable beverage passageway 96.

Referring to FIGS. 18 and 19, the plunger 56 is preferably disposed within the dispenser body 40 such that when the dispenser 30:5 is secured to bottle 38, the dispenser body 40 drives the plunger 56 to penetrate a portion of the dispenser body 60 to create a passageway 62 and thus, encouraging any flavoring component 32 that is consumed by a person to flow through the bottle 38 and back into the dispenser body 40 via the consumable beverage passageway 96.

Referring specifically to FIGS. 18 and 21, the plunger 56 is out of contact with the penetrable section 60 when the tubular sleeve 72 is beginning to engage the bottle 38. As the tubular sleeve 72 is threaded onto the bottle 38, the upper half of the dispenser body 40 drives the plunger 56 downwardly until the tubular sleeve 36 is engaged with the bottle 38 sufficiently to force the plunger 56 downwardly through the penetratable section 60 of the dispenser body 40. Those of ordinary skill in the art will appreciate that the penetrable portion 60 of any of the dispensers 30:1-30:6 can be formed by a foil, a partially perforated polymer section, or the like without departing from the scope of the present invention.

Referring to FIGS. 1-6, one embodiment of the present invention operates as follows. The second dispenser end 42B is inserted into the bottle opening 70 such that the dispenser lip 64 abuts the bottle surface 68. Then, the tubular sleeve 72 is slid over the top of the dispenser body 40 and threadably secured to the bottle 38. Thus, the tubular sleeve 72 clamps the dispenser lip 64 between an upper, annular ring, portion of the tubular sleeve 72 and the bottle surface 68 to secure the dispenser 30:1 thereto. Then, a user depresses button 80 to drive the plunger 56 downwardly through the penetrable section 60 to create a passageway 62. Any flavoring component 32 within the chamber 34 of the dispenser 30:1 is then allowed to pass through the passageway 62 and mix with the consumable beverage 36. Referring specifically to FIG. 5, while the plunger 56 is in the second plunger position and the cap 50 is in the first cap position, the consumable beverage 36 and/or the flavoring component 32 are preferably prevented from being ejected from the bottle via the dispenser 30;1. To drink from the consumable beverage bottle 38, the user pulls the cap 50 upwardly into the second cap position as shown in FIG. 6.

Referring to FIGS. 23-30 a seventh preferred embodiment of the dispenser 30:7 according to the present invention is shown. The dispenser 30:7 is preferably configured to be reusable. The bottom of the dispenser may include a recloseable cap 100 with a panel 102 therein that is moveable between an open position (shown in FIGS. 28-30) and a closed position (shown in FIGS. 24, 25, and 27). The tubular sleeve 72 may be slidably positionable over the dispenser 30:7 to secure the dispenser lip 64 to an upper edge 68 of the bottle opening 70. The panel 102 is preferably connected to the recloseable cap 100 via a living hinge. A section of the panel 102 preferably forms a bevel 122 that is configured to engage a protuberance 120 on the recloseable cap 100 to allow the panel to be secured in the closed position. While a preferred construction for a reusable dispenser 30:7 is shown, those of ordinary skill in the art will appreciate from this disclosure that any suitable recloseable/resealable structure or mechanism can be used on the lower end of the dispenser 30:7 without departing from the scope of the present invention.

The recloseable cap 100 can be integrally formed with the dispenser bottom or can be sonically welded thereto or secured using any suitable method without departing from the scope of the present invention. Furthermore, any other suitable mechanism for making the dispenser 30:7 reusable can be used without departing from the scope of the present invention.

Figure 33:
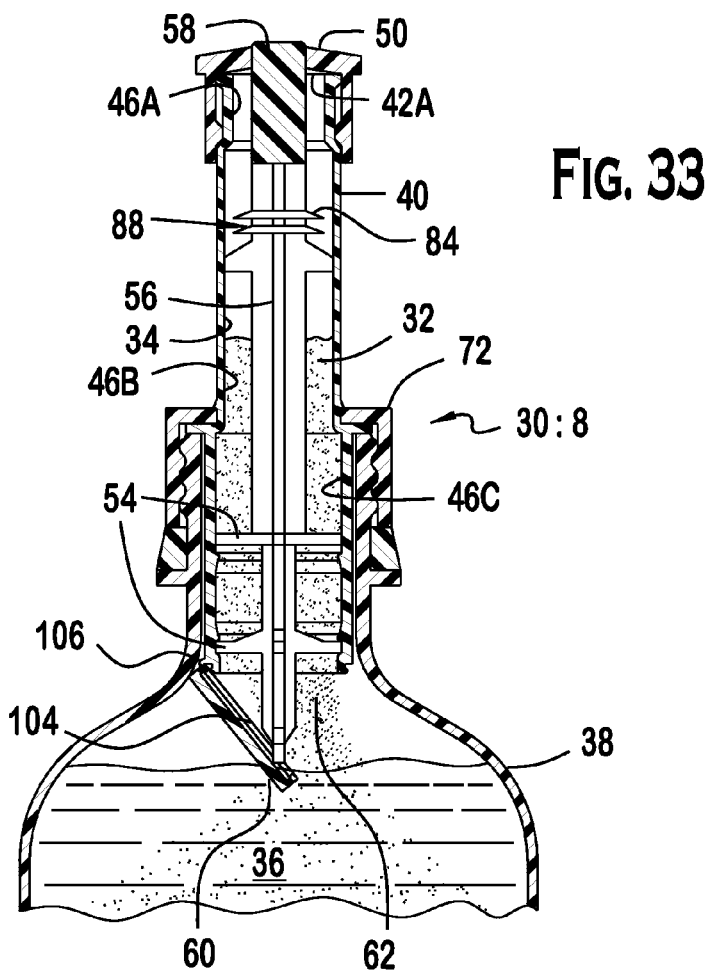
FIG. 33 is cross-sectional view of the dispenser of FIG. 32, similar to that of FIG. 28, and illustrates the plunger in the second plunger position and the cap in the first cap position; The recloseable lid, which forms part of the dispenser body, is in the open position after penetration of the dispenser body by the plunger.
Figure 34:
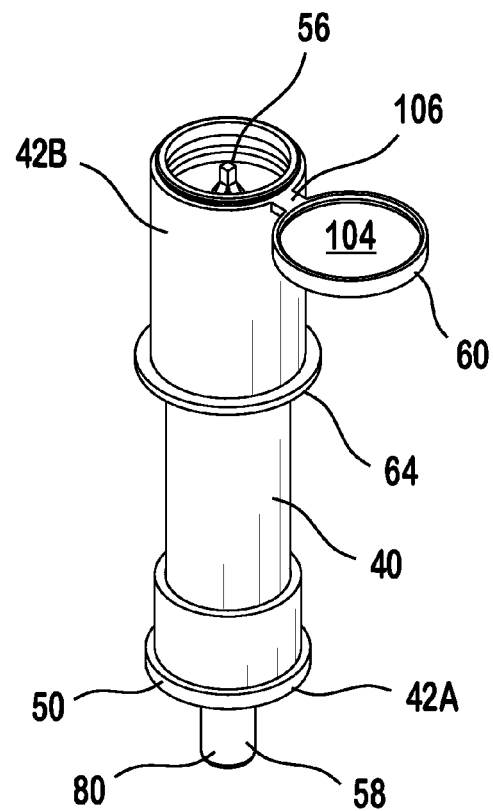
FIG. 34 is a perspective view of the dispenser of FIG. 33 with the lid in the open position.

FIGS. 31-34 illustrate an eighth preferred embodiment of the dispenser 30:8. The dispenser users a recloseable lid 104 that is connected via a strap 106. The lid 104 can form the lower end of the dispenser body 40 until it is penetrated by the plunger 56. FIG. 33 illustrates the recloseable lid 104 in the open position after penetration of the dispenser body by the plunger 56.

Figure 37:
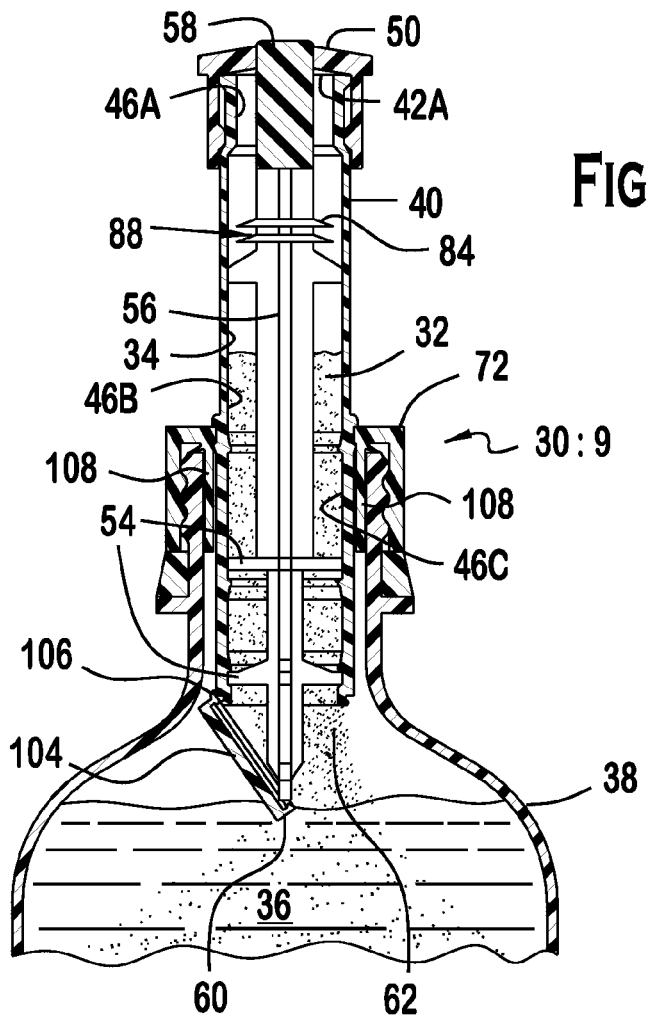
FIG. 37 is a cross-sectional view of the dispenser of FIG. 35, similar to that of FIG. 36, and illustrates the dispenser with the plunger in a second plunger position in which the plunger penetrates the dispenser body to form a passageway between the chamber and the interior of the bottle; The dispenser's recloseable lid is illustrated in the open position.
Figure 38:
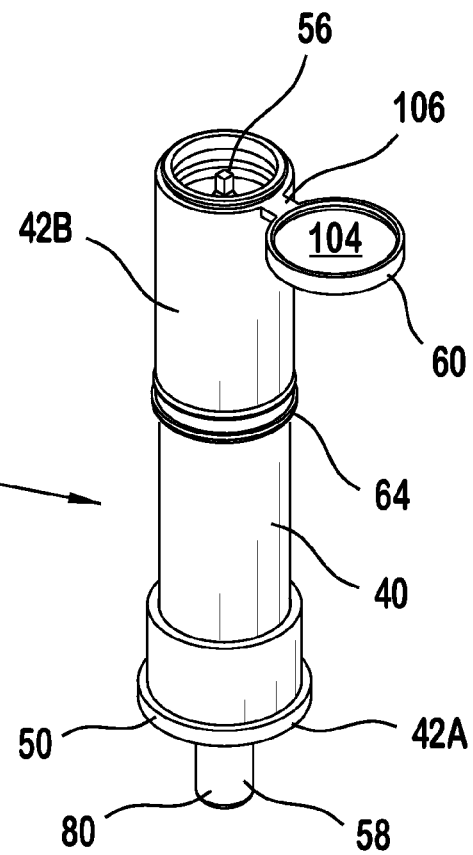
FIG. 38 is a perspective view of the dispenser with the recloseable lid in the open position.

FIGS. 35-41 illustrate a ninth preferred embodiment of the dispenser 30:9. The dispenser is preferably inserted into the tubular sleeve 72 after the tubular sleeve 72 has been attached to the bottle 38. This allows the dispenser 30:9 to be slid in and out of the bottle 38 with minimum manipulation to facilitate swapping dispensers during use or to facilitate the selection of an individual dispenser 30:9 prior to consumption of the bottle contents. It further allows the dispenser to be a generally cylindrical piece with a minimum of protruding components to facilitate shipping and handling by children. Referring to FIGS. 36 and 37 the dispenser 30:9 is preferably inserted into a portion 108 of the tubular sleeve 72 that may extend into the opening of the bottle. Referring to FIG. 36, the connection between the dispenser 30:9 and a portion 108 of the tubular sleeve 72 based on a preferred double lip 64 that extends around the dispenser 30:9. Alternatively, the connection can be a twist lock (shown in FIG. 39), detent, snap fit, tongue and groove (shown in FIG. 40), friction fit (shown in FIG. 41), or any other suitable connection without departing from the scope of the present invention.

FIG. 39 illustrates the dispenser 30:9 and a broken away portion of the tubular sleeve 72. The dispenser 30:9 can have a post 112 thereon for engaging a groove 110 along an inner surface of the portion 108 of the sleeve 72. The post 112 and groove 110 preferably combine to form a twist lock connection. Referring to FIG. 40, the dispenser 30:9 may use the post 112 for engaging a generally spiral slot 114 along an inner surface of the portion 108 of the sleeve 72 to form a tongue and groove connection. Referring to FIG. 41, the dispenser 30:9 may be engaged with the tubular sleeve 72 via the inner portion 108. The inner portion 108 of the tubular sleeve preferably tapers 118 inwardly in a generally conical fashion to provide an interference fit with the dispenser. The interference fit may be made more reliable by selecting materials that have high frictional coefficient therebetween. The tubular sleeve 72 preferably includes a gasket 116 along an upper part of the inner portion 108 to facilitate a fluid tight connection. While specific mechanisms for connection the dispenser 30:9 to the bottle have been disclosed, any suitable connection may be used without departing from the scope of the present invention.

While various shapes, configurations, chamber shapes, dispenser shapes, plunger configurations and bottle shapes have been described above and shown in the drawings for the various embodiments of the dispenser of the present invention, those of ordinary skill in the art will appreciate from this disclosure that any combination of the above features, fins, dispenser lips, or the like can be used, in any combination, without departing from the scope of the present invention. Accordingly, it is recognized by those skilled in the art that changes may be made to the above described embodiments of the invention without departing from the inventive concept thereof. It is understood, therefore, that this invention is not limited to the particular embodiments disclosed, but is intended to cover all modifications which are within the spirit and scope of the invention as defined by the appended claims and/or as shown in the attached drawings.

What is claimed is:

1. A dispenser for a bottle adapted to contain a consumable beverage, the dispenser being adapted for a person to drink from and being adapted to engage the bottle, the dispenser comprising:
   a dispenser body adapted to hold a flavoring component, the dispenser body having a first dispenser end, adapted for drinking therefrom, and having a second dispenser end, adapted to be engaged with the bottle;
   a plunger slidably disposed at least partially within the dispenser body for movement from a first plunger position to a second plunger position, in which the plunger creates a passageway through the dispenser body, the passageway being adapted to allow the flavoring component from the dispenser body to mix with the consumable beverage in the bottle;
   a cap slidably positioned on the first dispenser end of the dispenser body and defining a cap opening adapted to allow the person to drink the consumable beverage therefrom, the cap being moveable between a first cap position, in which the cap opening is proximate to the first dispenser end of the dispenser body, and a second cap position, in which the cap opening is spaced further from the first dispenser end than when the cap is in the first cap position, wherein when the plunger is in the second plunger position and the cap is in the first cap position, the plunger end cooperates with the cap to seal the cap opening so that the dispenser is adapted to prevent the consumable beverage from leaving the bottle; and
   a flexible and reclosable panel moveably located on the second dispenser end so that the dispenser can be refilled and reused.

2. A dispenser for a bottle adapted to contain a consumable beverage, the dispenser being adapted for a person to drink from and being adapted to engage the bottle, the dispenser comprising:
- a dispenser body adapted to hold a flavoring component, the dispenser body having a first dispenser end, adapted for drinking therefrom, and having a second dispenser end, adapted to be engaged with the bottle;
- a plunger slidably disposed at least partially within the dispenser body for movement from a first plunger position to a second plunger position, in which the plunger creates a passageway through the dispenser body, the passageway being adapted to allow the flavoring component from the dispenser body to mix with the consumable beverage in the bottle; and
- a cap slidably positioned on the first dispenser end of the dispenser body and defining a cap opening adapted to allow the person to drink the consumable beverage therefrom, the cap being moveable between a first cap position, in which the cap opening is proximate to the first dispenser end of the dispenser body, and a second cap position, in which the cap opening is spaced further from the first dispenser end than when the cap is in the first cap position, wherein when the plunger is in the second plunger position and the cap is in the first cap position, the plunger end cooperates with the cap to seal the cap opening so that the dispenser is adapted to prevent the consumable beverage from leaving the bottle;
- wherein the passageway is formed by the plunger moving a hinged portion of a recloseable cap located on the second dispenser end.

3. A dispenser for a bottle adapted to contain a consumable beverage, the dispenser being adapted for a person to drink from and being adapted to engage the bottle, the dispenser comprising:
- a dispenser body adapted to hold a flavoring component, the dispenser body having a first dispenser end, adapted for drinking therefrom, and having a second dispenser end, adapted to be engaged with the bottle;
- a plunger slidably disposed at least partially within the dispenser body for movement from a first plunger position to a second plunger position, in which the plunger creates a passageway through the dispenser body, the passageway being adapted to allow the flavoring component from the dispenser body to mix with the consumable beverage in the bottle; and
- a cap slidably positioned on the first dispenser end of the dispenser body and defining a cap opening adapted to allow the person to drink the consumable beverage therefrom, the cap being moveable between a first cap position, in which the cap opening is proximate to the first dispenser end of the dispenser body, and a second cap position, in which the cap opening is spaced further from the first dispenser end than when the cap is in the first cap position, wherein when the plunger is in the second plunger position and the cap is in the first cap position, the plunger end cooperates with the cap to seal the cap opening so that the dispenser is adapted to prevent the consumable beverage from leaving the bottle;
- wherein the dispenser body comprises a recloseable lid on the second dispenser end configured such that the plunger can open the lid to create the passageway through the dispenser body.

4. The dispenser of claim 3, wherein the plunger end forms a button that, while the plunger is in the first plunger position, is adapted for the person to depress to allow the flavoring component to mix with the consumable beverage.

5. The dispenser of claim 3, wherein the dispenser has a longitudinal axis and defines a chamber therein, the chamber having at least first and second chamber sections, the first chamber section including the first dispenser end, the first chamber cross-section, as measured perpendicular to the longitudinal axis, being greater than the second chamber cross-section, as measured perpendicular to the longitudinal axis.

6. The dispenser of claim 4, wherein the first and second chamber sections are generally cylindrical.

7. The dispenser of claim 3, wherein the first end of the dispenser body is open, a cap inner surface substantially closing the first dispenser end.

8. A dispenser for a bottle adapted to contain a consumable beverage, the dispenser being adapted for a person to drink from and being adapted to engage the bottle, the dispenser comprising:
- a dispenser body adapted to hold a flavoring component, the dispenser body having a first dispenser end, adapted for drinking therefrom, and having a second dispenser end, adapted to be engaged with the bottle;
- a plunger slidably disposed at least partially within the dispenser body for movement from a first plunger position to a second plunger position, in which the plunger creates a passageway through the dispenser body, the passageway being adapted to allow the flavoring component from the dispenser body to mix with the consumable beverage in the bottle; and
- a cap slidably positioned on the first dispenser end of the dispenser body and defining a cap opening adapted to allow the person to drink the consumable beverage therefrom, the cap being moveable between a first cap position, in which the cap opening is proximate to the first dispenser end of the dispenser body, and a second cap position, in which the cap opening is spaced further from the first dispenser end than when the cap is in the first cap position, wherein when the plunger is in the second plunger position and the cap is in the first cap position, the plunger end cooperates with the cap to seal the cap opening so that the dispenser is adapted to prevent the consumable beverage from leaving the bottle;
- wherein the dispenser has a longitudinal axis and defines a chamber therein, the chamber having at least first and second chamber sections, the first chamber section including the first dispenser end, the first chamber cross-section, as measured perpendicular to the longitudinal axis, being greater than the second chamber cross-section, as measured perpendicular to the longitudinal axis;
- wherein the first and second chamber sections are generally cylindrical; and
- wherein the plunger comprises at least one gasket extending outwardly therefrom, the at least one gasket forming a chamber seal between the plunger and an inner chamber surface along the first chamber section when the plunger is in the first plunger position, the chamber seal being adapted to prevent the flavoring component from being dispensed through the cap, the at least one gasket being spaced from the inner chamber surface along the second chamber section when the plunger is in the second position to form a chamber passageway, the chamber passageway being adapted to allow the flavoring component and/or the consumable beverage to flow toward the cap.

9. The dispenser of claim 8, wherein the plunger includes at least one guide projection extending outwardly therefrom and slidably abutting the inner chamber surface.

10. The dispenser of claim 9, wherein the chamber includes a chamber shoulder adapted to abut the at least one guide projection to prevent the plunger from being completely withdrawn from the dispenser body.

11. The dispenser of claim 10, wherein the chamber shoulder is formed at an interface between the second chamber section and a third chamber section, the third chamber section having a third chamber cross-section, as measured perpendicularly to the longitudinal axis, that is greater than the second chamber cross-section.

12. A dispenser for a bottle adapted to contain a consumable beverage, the dispenser being adapted for a person to drink from and being adapted to engage the bottle, the dispenser comprising:
  a dispenser body adapted to hold a flavoring component, the dispenser body having a first dispenser end, suitable for drinking therefrom, and having a second dispenser end, adapted to be engaged with the bottle;
  a cap slidably positioned on the first dispenser end of the dispenser body and defining a cap opening adapted to allow the person to drink the consumable beverage therefrom, the cap having an inner cap surface;
  a removable member disposed about the dispenser body and adapted to prevent the cap from sliding from a second cap position, in which the inner cap surface is spaced from the first dispenser end, to a first cap position, in which the inner cap surface is at least in close proximity to the first dispenser end; and
  a plunger slidably disposed at least partially within the dispenser body for movement from a first plunger position, in which the plunger generally extends between the inner cap surface and the second dispenser end, to a second plunger position, in which the plunger creates a passageway through the dispenser body, the passageway being adapted to allow the flavoring component from the dispenser body to mix with the consumable beverage in the bottle, wherein when the removable member is displaced from about the dispenser body, the cap can be moved into the first cap position to drive the plunger from the first plunger position to the second plunger position;
  wherein the passageway is formed by the plunger moving a portion of a recloseable cap located on the second dispenser end.

13. The dispenser of claim 12, wherein the dispenser has a longitudinal axis and defines a chamber therein, the chamber having at least first and second chamber sections, the first chamber section including the first dispenser end, the first chamber cross-section, as measured perpendicular to the longitudinal axis, being greater than the second chamber cross-section, as measured perpendicular to the longitudinal axis.

14. The dispenser of claim 13, wherein the first and second chamber sections are generally cylindrical.

15. The dispenser of claim 13, wherein the plunger comprises at least one gasket extending outwardly therefrom, the at least one gasket forming a chamber seal between the plunger and an inner chamber surface along the first chamber section when the plunger is in the first plunger position, the chamber seal being adapted to prevent the flavoring component from being dispensed through the cap, the at least one gasket being spaced from the inner chamber surface along the second chamber section when the plunger is in the second position to form a chamber passageway, the chamber passageway being adapted to allow the flavoring component and the consumable beverage to flow toward the cap.

* * * * *